(12) United States Patent
Gunaratnam et al.

(10) Patent No.: US 8,275,401 B2
(45) Date of Patent: Sep. 25, 2012

(54) DATA-CAPABLE NETWORK PRIORITIZATION WITH REDUCED DELAYS IN DATA SERVICE

(75) Inventors: Jayasri Gunaratnam, Waterloo (CA); Bryan Taylor, Kitchener (CA); Bao Quoc Nguyen, San Diego, CA (US); Hugh Hind, Waterloo (CA); Noushad Naqvi, Waterloo (CA); Darcy Richard Phipps, Waterloo (CA); Craig Ian Haight Swann, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/349,842

(22) Filed: Jan. 13, 2012

(65) Prior Publication Data

US 2012/0115478 A1 May 10, 2012

Related U.S. Application Data

(63) Continuation of application No. 12/813,136, filed on Jun. 10, 2010, now Pat. No. 8,107,985, which is a continuation of application No. 12/126,223, filed on May 23, 2008, now Pat. No. 7,747,266, which is a continuation of application No. 10/987,557, filed on Nov. 12, 2004, now Pat. No. 7,398,089.

(60) Provisional application No. 60/519,141, filed on Nov. 12, 2003.

(51) Int. Cl.
*H04B 7/00* (2006.01)
(52) U.S. Cl. ........... 455/510; 455/445; 455/435.1; 455/435.2; 455/435.3; 455/432.1; 455/434; 455/466; 455/422.1

(58) Field of Classification Search ........... 455/445, 455/432.1, 434, 435.1–435.3, 466, 422.1, 455/510
See application file for complete search history.

(56) References Cited

U.S. PATENT DOCUMENTS
5,355,516 A 10/1994 Herold et al.
(Continued)

FOREIGN PATENT DOCUMENTS
GB 2328845 A 3/1999

OTHER PUBLICATIONS
European Search Report & Written Opinion for EP Application 04797203.9, Jan. 9, 2007.
(Continued)

*Primary Examiner* — Patrick Edouard
*Assistant Examiner* — Shantell L Heiber
(74) *Attorney, Agent, or Firm* — John J. Oskorep, Esq.

(57) ABSTRACT

A mobile device sends to a wireless network a request for establishing a service. In response to a rejection of the request, the device reattempts the request so long as the total number of requests is less than a predetermined value. When the total number of rejected requests is greater than or equal to the predetermined value, the device selects a different wireless network with which to establish the communication service if the wireless network is a non-home network. Otherwise, if the wireless network is the home network, the mobile device runs a timer which is initialized with an internal timer value instead of a network timer value when the internal timer value is less than the network timer value. In response to an expiration of the timer, the mobile device sends to the wireless network another one or more requests for establishing the service.

20 Claims, 10 Drawing Sheets

U.S. PATENT DOCUMENTS

| | | | |
|---|---|---|---|
| 5,903,832 A | 5/1999 | Seppanen et al. | |
| 6,246,875 B1 | 6/2001 | Seazholtz et al. | |
| 6,349,208 B1 | 2/2002 | Sexton et al. | |
| 6,546,246 B1 | 4/2003 | Bridges et al. | |
| 6,628,954 B1 | 9/2003 | McGowan et al. | |
| 2002/0082032 A1 | 6/2002 | Hunzinger | |
| 2003/0129980 A1* | 7/2003 | Sayeedi | 455/435 |
| 2004/0260831 A1* | 12/2004 | Dyck et al. | 709/233 |
| 2005/0037753 A1* | 2/2005 | Andersen et al. | 455/435.2 |
| 2005/0239461 A1* | 10/2005 | Verma et al. | 455/435.1 |
| 2006/0104211 A1 | 5/2006 | Islam et al. | |

OTHER PUBLICATIONS

PCT Written Opinion & Search Report PCT/CA2004/001951, Mar. 8, 2005.

Supplemental European Search Report 04797203.9, Jan. 9, 2007.

* cited by examiner

DATA-CAPABLE NETWORK PRIORITIZATION WITH REDUCED DELAYS IN DATA SERVICE

CROSS-REFERENCES TO RELATED APPLICATIONS

This patent application is a continuation of and claims priority to U.S. non-provisional patent application having application Ser. No. 12/813,136 and filing date of 10 Jun. 2010, now U.S. Pat. No. 8,107,985, which is a continuation of and claims priority to U.S. non-provisional patent application having application Ser. No. 12/126,223 and filing date of 23 May 2008, now U.S. Pat. No. 7,747,266, which is a continuation of and claims priority to U.S. non-provisional patent application having application Ser. No. 10/987,557 and filing date of 12 Nov. 2004, now U.S. Pat. No. 7,398,089, which is being reissued in reissue application having application Ser. No. 12/552,744 and filing date of 2 Sep. 2009, which claims priority to U.S. provisional patent application having application No. 60/519,141 and filing date of 12 Nov. 2003 and U.S. provisional patent application having application No. 60/519,150 and filing date of 12 Nov. 2003, each application being hereby incorporated by reference herein.

BACKGROUND

1. Field of the Technology

The present application relates generally to mobile stations and network selection methods employed thereby.

2. Description of the Related Art

A mobile communication device, such as a cellular mobile station, may be capable of making and receiving telephone calls and/or sending and receiving data over a wireless communication network. Before it is able to do this, the mobile station selects and registers with one of a plurality of communication networks which are available within its geographic coverage area. After registering with the selected network, the mobile station operates in an idle mode where it "camps-on" a particular wireless communication channel of the network to monitor for calls or messages. "Network selection" is the particular process performed by the mobile station for selecting the one communication network through which to register and operate.

Cellular telephony operation and network selection schemes are documented in standards specifications that govern the behavior of cellular mobile stations and associated systems. One well-known cellular standard is the Global System for Mobile Communications (GSM) standard. GSM 03.22/European Technical Standards Institute (ETSI) Technical Specification (TS) 100 930, Technical Specification (TS) 23.122 from the $3^{rd}$ Generation Partnership Project (3GPP), and other related standards documents describe the many details of cellular operation and network selection. These documents describe how a mobile station behaves as it moves and roams between various regions and countries to maintain coverage with networks (referred to as Public Land Mobile Networks or PLMNs), primarily for the purpose of providing continuous telephone service.

Traditionally, a mobile station performs network selection by initially scanning to identify all available communication networks within its surrounding coverage area. Each network is identified by a unique Mobile Country Code (MCC) and Mobile Network Code (MNC) pair. If the Home Public Land Mobile Network (HPLMN) or "home network" of the mobile station is available, the mobile station will ordinarily select and operate with the home network. If the HPLMN is unavailable, the mobile station will ordinarily select and operate with the communication network having the highest priority in a preferred network list stored in memory of the mobile station. There may be several preferred network lists, commonly referred to as Preferred PLMN lists (PPLMN lists), stored on a Subscriber Identity Module (SIM) card of the mobile station. For example, the PPLMN lists may include a user-controlled PPLMN (U-PPLMN) list and an operator-controlled PPLMN (O-PPLMN) list.

The above-described network selection method is commonly referred to as an "automatic" network selection method. As an alternative to this automatic selection method, an end-user of the mobile station may be provided with the ability to manually select from a plurality of listed available networks which are visibly displayed on the mobile device. This conventional network selection method may be referred to as a "manual" network selection method.

Mobile data communication devices which are known to facilitate services such as wireless e-mail, Internet access, as well as voice telephony, are becoming more and more popular. In addition to operating in accordance with GSM for voice telephony, these mobile stations may operate in accordance with General Packet Radio Service (GPRS). GPRS is a packet-based communication protocol for mobile stations that allows data packets to be sent and received through a wireless communication network. In order to receive data services through a GPRS-capable network, the mobile station first performs a "GPRS attach" and provides its identification code and availability to the wireless network. For GSM/GPRS, this code could include both the International Mobile Subscriber Identity (IMSI) or Packet Temporary Mobile Subscriber Identity (PTMSI), which identify a communication network account or subscription, and a Mobile Station ISDN/PSTN Number MSISDN, which identifies the mobile station user or subscriber. After attaching to the network, the mobile station will attempt to establish a "Packet Data Protocol (PDP) context". The PDP context targets an access point name (APN) and home service of the mobile station. The PDP context also allocates an IP address for the mobile station so that IP packets can be communicated.

In order to operate fully as intended, these "data-capable" mobile stations must have the appropriate communication services supported and made available by the communication network that it is registered with. Ideally, all communication networks around the world should be connected through roaming agreements, and support and make available all the different types of communication services that a mobile station is capable of providing. In practice, however, some communication networks do not have or cannot make a particular communication service (e.g. a data communication service) available to a mobile station. This problem may be partially mitigated in a given coverage area, as there may be several communication networks from which the mobile station may select.

Traditional network selection techniques for GSM services, however, do not take into consideration the availability of other services (e.g. data communication services) in its decision-making process. That is, traditional network selection techniques are voice-service-centric. As a result, an inadequate communication network may be selected by such mobile stations. For example, a mobile station may select a communication network that can provide an acceptable voice service but not a data service, even though another adequate and available network could provide both the voice and the data service. Such traditional operation is undesirable, especially for mobile stations that are primarily intended to provide the end-user with a data communication service (e.g.

portable e-mail devices). In particular, a GPRS/GSM-capable network is more preferably for these mobile stations than are GSM-only networks.

A better and non-traditional network selection technique for these mobile stations would involve prioritizing the selection of data-capable communication networks (e.g. GPRS) over voice-only networks (e.g. GSM). In such a procedure, the mobile station may have to determine whether or not the data service is actually made available by the communication network. More particularly, the mobile station makes a request for a data service which may be accepted or denied by the network. When data service is denied, the mobile station receives different "reject cause codes" from the network which are associated with different reasons for service denial. Depending on the reject code, the mobile station may have to wait until it may request the data service again, a timer expires, the network changes, or the user cycles the power (off & on) of the mobile device. If the end user is not viewing the display of the mobile station (e.g. the mobile station is carried in a holster), the user will not be aware of the data service unavailability and may not receive important push data in a timely fashion (e.g. pushed e-mail messages).

In a related problem, if the GPRS attach or a Routing Area Update (RAU) attempt is not successful with the network (e.g. no network response, or the receipt of a rejection code), the mobile station consecutively reattempts for up to five (5) times. If the GPRS attach or RAU attempt counter is greater than or equal to five, the mobile station must place itself into a "GPRS Deregistered" state and start a timer designated as "timer 3302". Timer 3302 is set to a value taken from GSM timer 3212, which is a periodic location update timer. See e.g. 3GPP specification 4.08 Release 1997. From 3GPP specification 24.08 Release 1999, the default value of T3302 is 12 minutes if one is not provided by the network. Thus, the mobile station ordinarily receives the value for timer 3212 over-the-air by the network or, if one is not provided by the network, utilizes a default value. If provided over-the-air by the network, the timer may be set to up to four (4) hours. The mobile station is not able to attempt for GPRS services again until this timer 3302 expires. As apparent, this may cause substantial data delays (e.g. delays in receiving "pushed" e-mail messages).

Accordingly, there is a resulting need for network selection methods and apparatus that overcome the deficiencies of the prior art.

DETAILED DESCRIPTION OF THE PREFERRED EMBODIMENTS

Methods and apparatus for performing network selection by a mobile communication device are described herein. In situations where more than one wireless network is available in a given coverage area, a method of selecting or assigning priority to a wireless network that provides a data service (or the "best" services) over ones that do not is utilized. Such methods are applicable to mobile devices that operate in accordance with any suitable communication standard, but are particularly applicable to advanced General Packet Radio Service (GPRS) capable mobile stations. In this environment, the method may place a priority on selecting a GPRS-capable network over a Global System for Mobile Communications (GSM) only capable network.

Specifically, reduced delays in data service offered by data-capable networks are provided. One illustrative method includes the steps of receiving and storing in memory a first timer value which is broadcasted by a wireless communication network for use in the mobile station; causing a request for data connectivity to be transmitted through the wireless network, and reattempting the request up to a plurality of times when data connectivity fails; after the one or more reattempted requests for data connectivity fail, activating a timer based on a second timer value which is less than the first timer value; and repeating the transmitting of requests for data connectivity after expiration of the timer.

Figure 1:
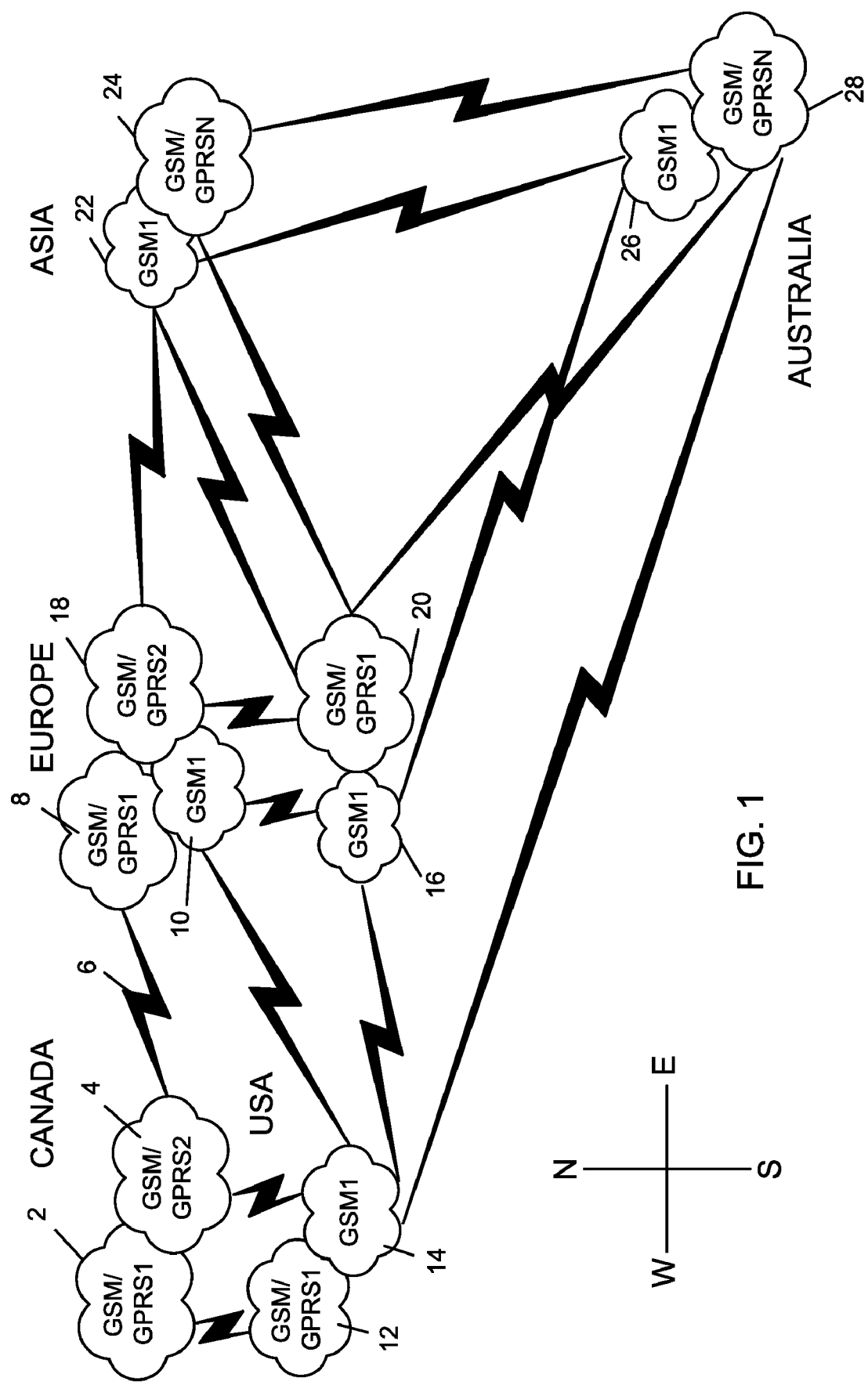
FIG. 1 is a block diagram illustrating a global network interconnection.

With reference now to FIG. 1, an overview of how networks connect around the world are described. GSM and GPRS networks are shown as example wireless communication networks. The voice network known as GSM is the older component and has been available since about 1992 while GPRS, a data component that has been combined or overlaid with GSM, has been available only since about 1999. These two networks are now common throughout the world and have some of the fastest deployment rates of any voice and data networks. Such combined voice and data networks also include modern Code Division Multiple Access (CDMA) networks and third-generation (3G) networks like Enhanced Data-rates for Global Evolution (EDGE) and Universal Mobile Telecommunications Systems (UMTS), currently under development.

In FIG. 1, there are five GSM only networks 10, 14, 16, 22, 26 and eight GSM/GPRS combined networks 2, 4, 8, 12, 18, 20, 24, 28, shown in various parts of the world. At any point in time, a given country might have one or more GSM and/or GSM/GPRS networks. Each network operator makes financial and practical decisions as to when it should purchase and implement GPRS functionality onto an existing GSM network. Therefore, a user of a GSM phone or a GPRS capable mobile station might enter a given country and be faced with networks that support either GSM only or combined GSM/GPRS.

These networks implement interconnections to each other to support roaming between countries and to support billing and roaming notifications between networks. Although shown as separate physical networks in FIG. 1, the thirteen networks (five GSM and eight GSM/GPRS) interconnect to form a total of four networks—three GSM/GPRS networks 1, 2, and N, and one GSM network 1. A GSM network could connect to one or more other GSM networks, one or more GSM/GPRS networks, or both. A GSM/GPRS network could similarly connect with other GSM/GPRS networks, GSM networks, or both GPRS/GSM networks and GSM networks. Networks in Canada, shown as GSM/GPRS1 2 and GSM/GPRS2 4, respectively connect with GSM/GPRS1 12 and GSM1 14 shown in the USA. GSM/GPRS2 4 also connects with GSM/GPRS1 8 shown in the England area via communication link 6. Network GSM1 14 from the USA also connects with GSM1 10 shown in the middle of Europe. Other networks 16 through 28 are similarly interconnected as shown. These interconnections form the basis of traffic movement and roaming support between the networks.

As a mobile station enters a given country or communication network coverage area, it may be capable of communicating with one or more wireless GSM or GSM/GPRS networks to receive data and voice signals. In England, for example, there are currently four GSM or GSM/GPRS networks deployed and available for mobile stations to connect with. Normally, cellular telephones or mobile stations sold in England will only work with one network. However, mobile stations entering England from France might have two or three networks to select from. Selection of a particular network is currently performed by a mobile station randomly, based on the strongest received signal at the time of arrival into the country.

Figure 2:
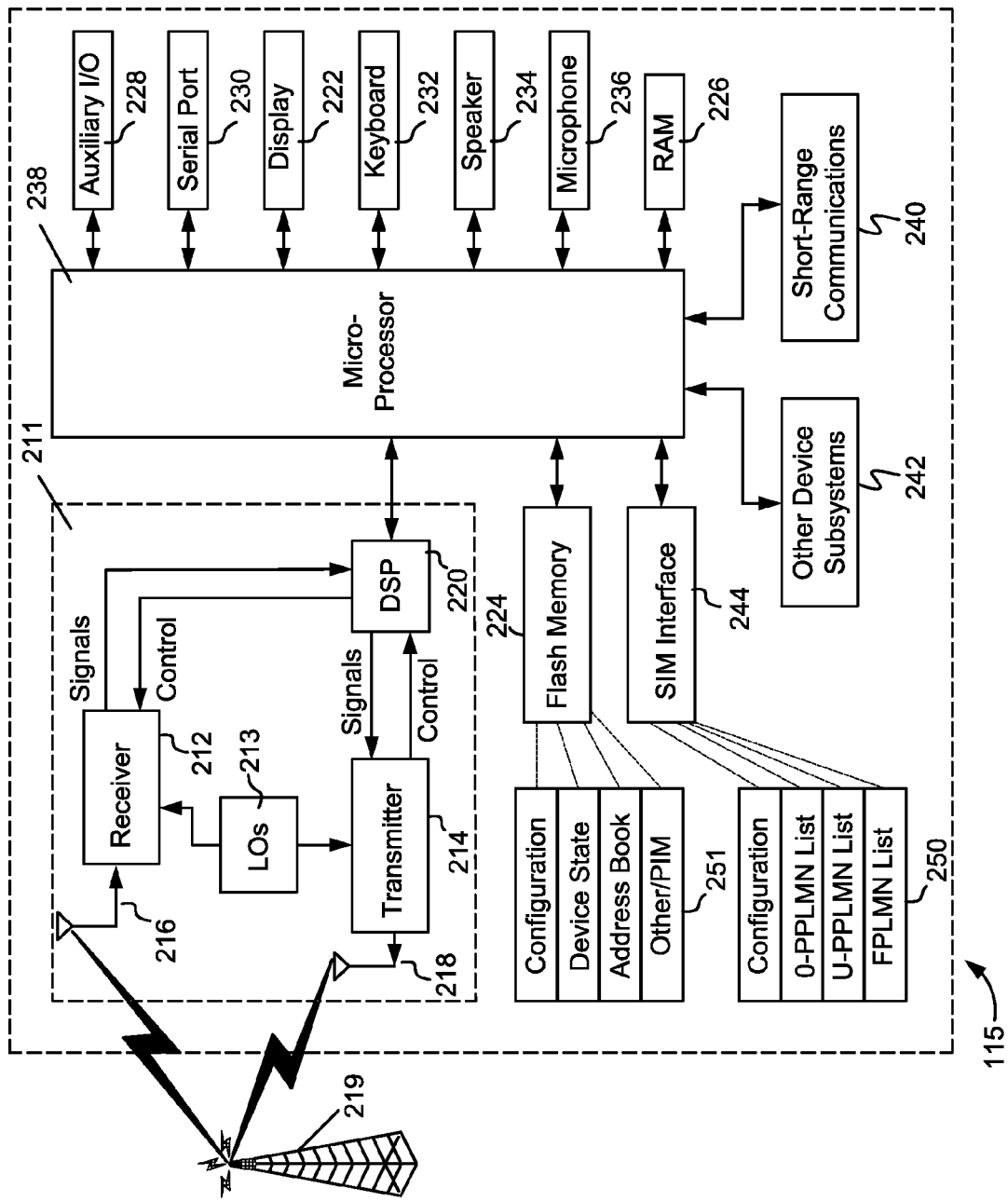
FIG. 2 is a block diagram of a mobile communication device which is a cellular mobile station.

Turning now to FIG. 2, a block diagram is shown of a cellular mobile station, which is one type of mobile communication device. Mobile station 115 is preferably a two-way wireless communication device having at least voice and data communication capabilities. Mobile station 115 preferably has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, or a data communication device, as examples.

Where mobile station 115 is enabled for two-way communication, it will incorporate a communication subsystem 211, including both a receiver 212 and a transmitter 214, as well as associated components such as one or more, preferably embedded or internal, antenna elements 216 and 218, local oscillators (LOs) 213, and a processing module such as a digital signal processor (DSP) 220. As will be apparent to those skilled in the field of communications, the particular design of the communication subsystem 211 will be dependent upon the communication network in which the device is intended to operate. For example, mobile station 115 may include a communication subsystem 211 designed to operate within the Mobitex™ mobile communication system, the DataTAC™ mobile communication system, or a GPRS network.

Network access requirements will also vary depending upon the type of network 219. For example, in the Mobitex and DataTAC networks, mobile station 115 is registered on the network using a unique identification number associated with each mobile station. In GPRS networks, however, network access is associated with a subscriber or user of mobile station 115. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 115 will be unable to carry out any other functions involving communications over the network 219. The SIM interface 244 is normally similar to a card-slot into which a SIM card can be inserted and removed. The SIM card can have approximately 64K of memory and hold many key configuration, identification, and subscriber related information 250. The O-PPLMN, the U-PPLMN, and the forbidden PLMN (FPLMN) are initially received from the SIM card 250. Reference to the PPLMN hereinafter will generally apply to both the O-PPLMN and U-PPLMN.

When required network registration or activation procedures have been completed, mobile station 115 may send and receive communication signals over the network 219. Signals received by antenna 216 through communication network 219 are input to receiver 212, which may perform such common receiver functions as signal amplification, frequency down conversion, filtering, channel selection and the like, and in the example system shown in FIG. 2, analog to digital (A/D) conversion. A/D conversion of a received signal allows more complex communication functions such as demodulation and decoding to be performed in the DSP 220. In a similar manner, signals to be transmitted are processed, including modulation and encoding for example, by DSP 220 and input to transmitter 214 for digital to analog conversion, frequency up conversion, filtering, amplification and transmission over the communication network 219 via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Mobile station 115 preferably includes a microprocessor 238 which controls the overall operation of the device. Communication functions, including at least data and voice communications, are performed through communication subsystem 211. Microprocessor 238 also interacts with further device subsystems such as the display 222, flash memory 224, random access memory (RAM) 226, auxiliary input/output (I/O) subsystems 228, serial port 230, keyboard 232, speaker 234, microphone 236, a short-range communications subsystem 240 and any other device subsystems generally designated as 242.

Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list.

Operating system software used by the microprocessor 238 is preferably stored in a persistent store such as flash memory 224, which may instead be a read-only memory (ROM) or similar storage element (not shown). Those skilled in the art will appreciate that the operating system, specific device applications, or parts thereof, may be temporarily loaded into a volatile memory such as RAM 226. Received communication signals may also be stored in RAM 226.

Microprocessor 238, in addition to its operating system functions, preferably enables execution of software applications on the mobile station. A predetermined set of applications that control basic operations, including at least data and voice communication applications for example, will normally be installed on mobile station 115 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 219. In a preferred embodiment, the PIM data items are seamlessly integrated, synchronized and updated, via the wireless network 219, with the mobile station user's corresponding data items stored or associated with a host computer system. Further applications may also be loaded onto the mobile station 115 through the network 219, an auxiliary I/O subsystem 228, serial port 230, short-range communications subsystem 240 or any other suitable subsystem 242, and installed by a user in the RAM 226 or preferably a non-volatile store (not shown) for execution by the microprocessor 238. Such flexibility in application installation increases the functionality of the device and may provide enhanced on-device functions, communication-related functions, or both. For example, secure communication applications may enable electronic commerce functions and other such financial transactions to be performed using the mobile station 115.

In a data communication mode, a received signal such as a text message or web page download will be processed by the communication subsystem 211 and input to the microprocessor 238, which preferably further processes the received signal for output to the display 222, or alternatively to an auxiliary I/O device 228. A user of mobile station 115 may also compose data items such as email messages for example, using the keyboard 232, which is preferably a complete alphanumeric keyboard or telephone-type keypad, in conjunction with the display 222 and possibly an auxiliary I/O device 228. Such composed items may then be transmitted over a communication network through the communication subsystem 211, and stored in portions 251 of flash memory 224.

For voice communications, overall operation of mobile station 115 is similar, except that received signals would preferably be output to a speaker 234 and signals for transmission would be generated by a microphone 236. Alternative voice or audio I/O subsystems, such as a voice message recording subsystem, may also be implemented on mobile station 115. Although voice or audio signal output is preferably accomplished primarily through the speaker 234, display 222 may also be used to provide an indication of the identity of a calling party, the duration of a voice call, or other voice call related information for example.

Serial port 230 in FIG. 2 would normally be implemented in a personal digital assistant (PDA)-type mobile station for which synchronization with a user's desktop computer (not shown) may be desirable, but is an optional device component. Such a port 230 would enable a user to set preferences through an external device or software application and would extend the capabilities of mobile station 115 by providing for information or software downloads to mobile station 115 other than through a wireless communication network. The alternate download path may for example be used to load an encryption key onto the device through a direct and thus reliable and trusted connection to thereby enable secure device communication.

A short-range communications subsystem 240 is a further optional component which may provide for communication between mobile station 115 and different systems or devices, which need not necessarily be similar devices. For example, the subsystem 240 may include an infrared device and associated circuits and components or a Bluetooth™ communication module to provide for communication with similarly-enabled systems and devices.

Figure 3:
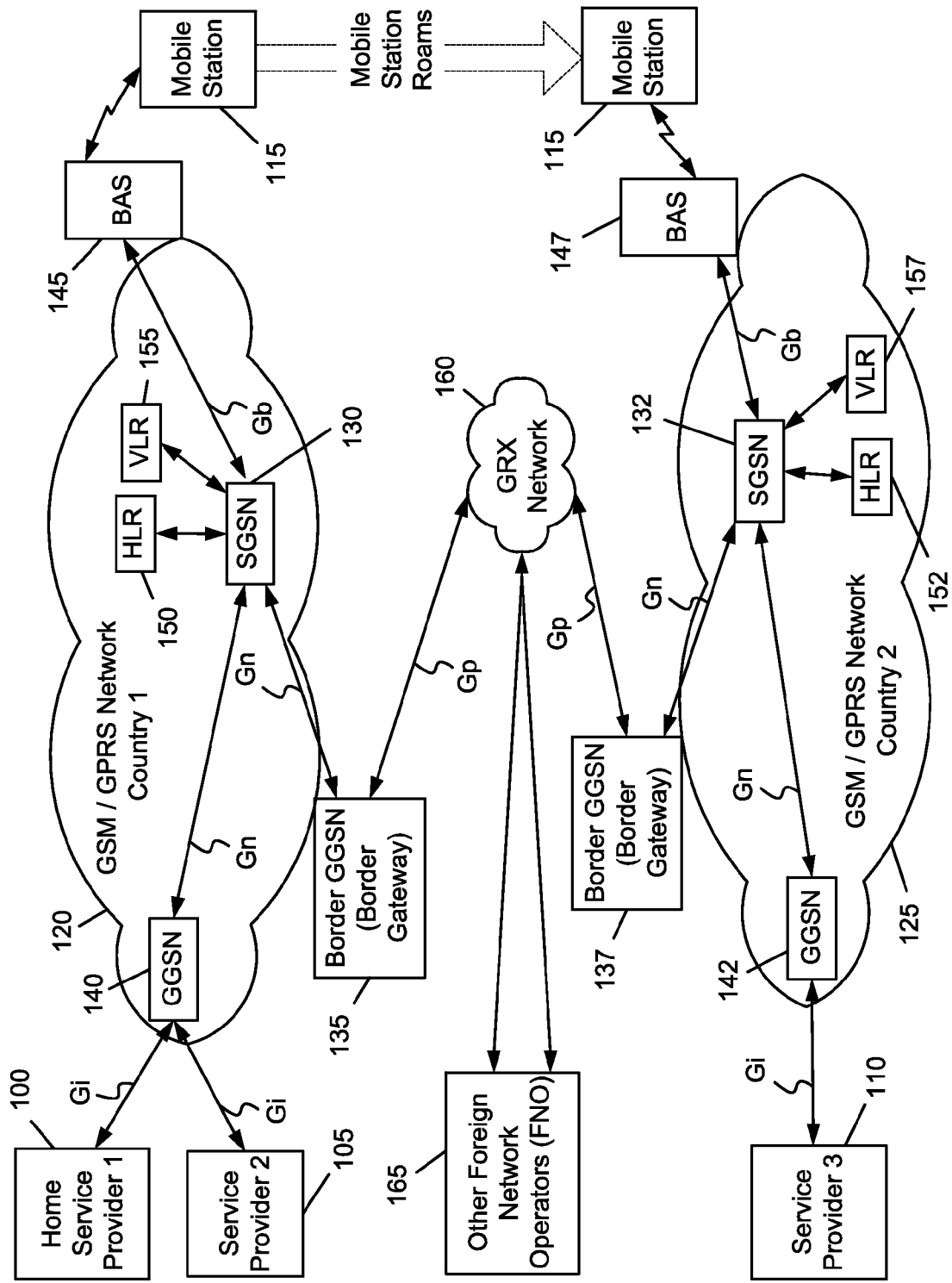
FIG. 3 is a block diagram showing two GSM/GPRS networks and a mobile station roaming between them.

FIG. 3 is a block diagram showing two GSM/GPRS networks and a mobile station roaming between them. FIG. 3 depicts a mobile station 115 roaming between two GSM/GPRS networks 120 and 125. This type of roaming arrangement is similar to how a GSM-only network might handle roaming, but with minor differences. In a GSM/GPRS combined network, a mobile station that supports only voice, only data, or a combination of voice and data will be treated similarly with respect to roaming between networks. A mobile station entering a given area or country can detect the GSM and GSM/GPRS networks through special RF radio channel interactions. The illustration of FIG. 3 provides a quick reference summary to describe how the process works. Roaming relationships between operators are established mainly for billing issues. Special Inter operator tariff (IoT) arrangements can be established between operators for GSM traffic only, or GSM and GPRS traffic. It is these relationships that are reflected in the PPLMN and FPLMN lists within the mobile station SIM cards.

GSM/GPRS Network 1 is the home network 120 for the user of mobile station 115. The home network for the user is referred to as the home public land mobile network (HPLMN) and mobile stations registered within that network are maintained in a home location registry (HLR) 150. HLR 150 is used to verify subscribers on the home network, and to confirm home subscribers on other networks. Each wireless network supports a range of services where each of the service access points tends to be a fixed connection, not a radio-based connection. Fixed connections generally allow greater capacity of data throughput for a large number of service subscribers supported by a single Access Point Name (APN). In FIG. 3, one such service is termed a home service provider 100, as it might be the primary communications service for a given group of mobile stations 115. Some mobile stations 115 might have a single home service provider 100, or they might have several services 105, 110 that they access.

The main components in GSM/GPRS network 125 include base station 145, the serving GPRS support node (SGSN) 130, the gateway GPRS support node (GGSN) 140, the Border GGSN node 135, the HLR (home location registry) 150 and the VLR (visitor location registry) 155.

Conventionally, when mobile station 115 is within a coverage area of home network 120, it communicates via base station 145 back through network 120 to home service provider 100. When mobile station 115 is looking for coverage, especially when there might be several networks available, it normally checks for the HPLMN first. As the user roams to another country or region where home network 120 is no longer available, mobile station 115 scans for all available base stations 147 via received, normally radio frequency (RF), signal strengths. To one skilled in the art, it is understood that selecting a 'strong enough' RF signal strength is open to a wide range of settings and interpretations. As an example, the GSM standards specify that a signal strength of −85 dBm or more should be considered an appropriate level for a 'strong enough' signal. However, this exact signal level is not essential to the systems and methods described herein, and other values may be useful, depending upon the particular network, mobile station or type of network or mobile station.

Those skilled in the art will appreciate that such scanning processes have pre-defined patterns. In a GSM or GPRS network, for example, scanning operations are defined in the standards governing GSM mobile stations. There is some flexibility in the standards, allowing a user to have some participation in the selection of a network to be used outside of the HPLMN. Each network is defined as a PLMN, and the relationship between PLMNs can be defined in tables within mobile station 115. Once mobile station 115 has identified base stations 147 and thus the networks within its range, it turns to the PPLMN list to see if one of the networks matches a network in the PPLMN list.

In conventional GPRS mobile stations, there are two types of PPLMN lists within the mobile station 115, namely an O-PPLMN and a U-PPLMN as shown in FIG. 2. The user-defined list is a relatively new concept and is in limited use at the current time. Similarly, mobile station 115 also has a Forbidden PLMN (FPLMN) list which it uses to exclude certain network connections. There is also a chance that a network located during a scanning operation does not fall into either of these lists. In this case, the network can preferably still be used in response to a confirmation by a mobile station user, through a dialog box for example, as to which network should be used.

GPRS networks are normally linked through a GPRS routing exchange (GRX) 160 and a border GGSN 135 and 137. The signaling involved with this exchange is described herein to the extent necessary to illustrate aspects of the invention. Further details of GRX 160 may be apparent to those skilled in the art, and can also be found in the GSM standards documents dealing with support for roaming in GPRS (3GPP specification 23.122).

When mobile station 115 experiences a prolonged out-of-coverage situation, it begins to look for RF signals from base stations 145 or 147. Once a signal is acquired, the radio protocols inform mobile station 115 which network has been reached and the capabilities of that network. Each network has a signature, and a GPRS-capable base station has an extended handshake protocol beyond the GSM protocol to identify its data capabilities. Within a GSM/GPRS network there exists a mobile country code (MCC) and a mobile network code (MNC) which contains a network assigned value and an access technology number. The access technology number indicates the radio frequency range of the network, i.e. 900 MHz, 1800 MHz, 1900 MHz, etc.

As mobile station 115 selects a network, it performs an "attach" to the network and provides its identification code. For GSM/GPRS, this code could include both the International Mobile Subscriber Identity (IMSI) or Temporary Mobile Subscriber Identity (TMSI), which identify a communication network account or subscription, and a Mobile Station ISDN/PSTN Number MSISDN, which identifies the mobile station user or subscriber. If mobile station 115 is attempting to attach to a network other than its home network 120, such as network 125, then the other network 125 will use the GRX network 160 to verify the subscription with home network 120. This causes home network 120 to reference HLR 150 to determine if the subscription is valid. Once verified, mobile station 115 is placed in VLR table 157 of visiting network 125. To one skilled in the art, this procedure is similar in a GSM-only network, except that the link between the home and visiting networks would be through a Gateway Mobile Switching Center (MSC) component.

After attaching to network 125, mobile station 115 will attempt to open a Packet Data Protocol (PDP) context to home service provider 100 through the local SGSN 132 in GSM/GPRS network in country-2 125. The PDP context targets an APN and home service 100. The PDP context also allocates an IP address for mobile station 115 so that IP packets can be transmitted in either direction. SGSN 132 detects mobile station 115 as a visiting mobile station 115 and routes the request through border GGSN 137 and onward to the correct GRX connection in GRX network 160 to a corresponding border GGSN 135 in home network 120. As mentioned above, this determination is made by the identification information provided by mobile station 115 during the attach process.

Each interface in the GSM/GPRS network is labeled to identify which protocol is used. Between all base stations 145 and SGSN 130, is the Gb interface. Between SGSN 130 and GGSN 140 is the Gn interface, which is also used between SGSN 130 and border GGSN 145. Between GGSN 140 and all service providers, the Gi interface is used, and between border gateways 135 and GRX network 160, the Gp interface is used. From GRX network 160, all other foreign network operators (FNO) systems 165 can be reached, assuming they have commonly linked GRX networks.

GSM network standards specify particular steps that mobile station 115 must perform to select a base station 147 in GSM/GPRS network in country-2 125. First, mobile station 115 must achieve a certain minimum level of signal strength with the base station. Once signal strength is established and the networks associated with each base station which meet the minimum signal strength criterion are identified, mobile station 115 uses its PPLMN and FPLMN lists on the SIM to determine what it considers the "best" network choice. Mobile station 115 checks the PPLMN list to see if one of the newly located networks matches a network on the PPLMN list. Similarly, mobile station 115 also checks the FPLMN list to determine which networks are forbidden. If any of the newly located networks occur in the FPLMN, then those networks are excluded from any further connection operations. If there are no matches to the PPLMN list, mobile station 115 may attempt to select one of the recently located networks based on signal strength.

Figure 4:
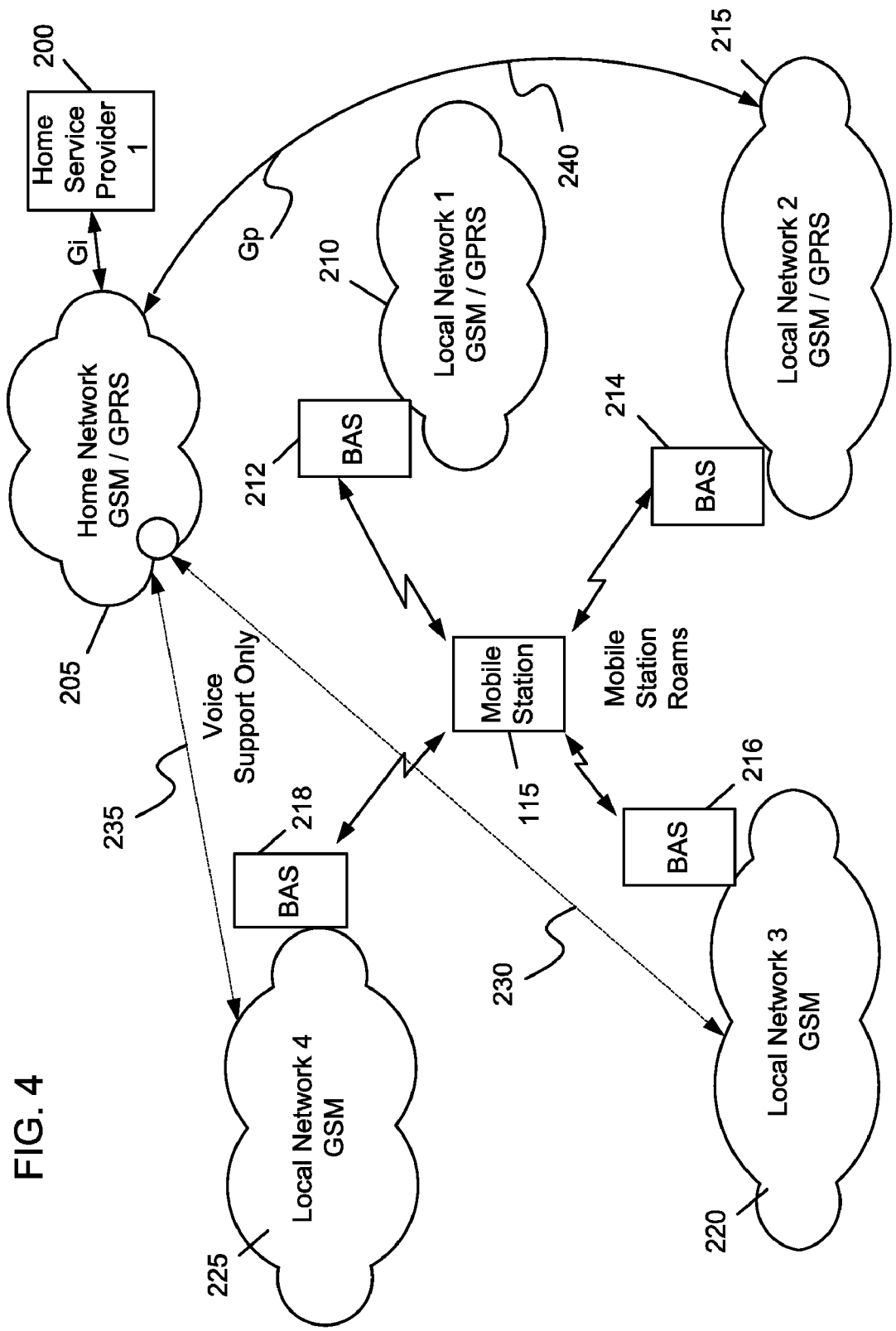
FIG. 4 is a block diagram illustrating a mobile station in a region where there are several communication networks of different types.

FIG. 4 is a block diagram illustrating a mobile station in a region where there are several networks of different types. In FIG. 4, mobile station 115 is shown in a region with four networks 210, 215, 220, 225, each having a base station 212, 214, 216, 218. For illustrative purposes, it is assumed that each base station 212, 214, 216, 218 has similar RF strength from the point of view of mobile station 115, and that mobile station 115 receives "strong enough" signals, from Local Network 1 210, Local Network 2 215, Local Network 3 220, and Local Network 4 225. Two of the networks 210 and 215 are GPRS capable and two of the networks 220 and 225 are GSM-only networks that are not GPRS capable.

According to the present application, in order for mobile station 115 to maximize its capabilities as a multi-functional mobile station (e.g. capable of both data and voice communication services), it should select one of the GPRS networks 210 and 215. In conventional GSM operation, mobile station 115 would compare all networks from which received signals are above any minimum required signal strength level and match them against the top-most network found in the PPLMN. Since the PPLMN is in priority order, a GSM mobile station must, by definition, follow the ordering of this list. In FIG. 4, for example, if Local Network 4 225 is the highest network listed in the PPLMN list then mobile station 115 must camp on this network. However, this process ignores the fact that mobile station 115 might also be data-capable. The choice of Local Network 4 225, which does not support data communications, may therefore not always be optimal for mobile station 115.

To improve the capabilities of mobile station 115, the search for a better network preferably takes other factors into consideration. Since mobile station 115 cannot effectively communicate when signal strength is below a certain level, only network base stations with 'strong enough' signals are located, substantially as described above. According to one aspect of the invention, data-capable networks, such as GPRS networks, are then identified. Mobile station 115 may then determine which of the identified data-capable networks is listed first on a preferred network list, which in GSM/GPRS mobile stations would be the PPLMN list. Mobile station 115 then checks to ensure that an interconnection, such as a GRX network for a GPRS network, is available to the home network from this highest-priority data-capable network on the preferred list. If no interconnection to the home network from the highest priority data-capable network is available, then mobile station 115 continues to try the identified data-capable networks that are also in the preferred list until a link is found back to the home network.

If no links can be found that connect to the home network, then mobile station 115 may revert to traditional network selection of a non-data-capable network such as a GSM network, as described above. Alternatively, the network selection method might stop after scanning all data-capable networks for links to the home network. This may be particularly desirable when the data-capable networks have more capabilities compared to a non-data-capable network. In some circumstances, even if a user cannot reach their home network, they may be able to better use the mobile station on the new network, for example, to access the Internet at large.

Referring again to FIG. 4, mobile station 115 normally has access to a preferred network list in the form of a PPLMN stored on a SIM card. Data-capable networks include the GSM/GPRS Local Networks 1 and 2, 210 and 215, whereas the GSM Local Networks 3 and 4, 220 and 225, represent examples of non-data-capable networks.

If mobile station 115 performs the network selection method described briefly above, and it is assumed that the PPLMN list follows the ordering of the networks shown in FIG. 4, the first network that should be attempted is the Local Network 1 210. However, since Local Network 1 210 does not have a GRX connection back to the home PLMN 205, Local Network 2 215 will be tried next. Since this network does have a Gp link 240 back to home PLMN 205 and home service provider 200, it will be selected by mobile station 115. If Local Network 2 215, the last available data-capable network, did not have a connection back to home PLMN 205, the first GSM network would be tried. The first GSM network tried would be Local Network 3 220, and link 230 would be used to communicate with the HLR in that home PLMN 205 to verify the user's account information. If that fails, Local Network 4 225 would be tried via link 235.

In another embodiment of FIG. 4, the new networks 210, 215, 220, 225 are not included on the O-PPLMN list on mobile station 115. This situation is more difficult, as the U-PPLMN list may come into effect, if it exists, in a memory such as the Flash memory 224 or the RAM 226 (FIG. 2).

One common way to build up a U-PPLMN is through previous user or "manual" network selections. As in the above example of FIG. 4, it is assumed that mobile station 115 has entered a country or region where it receives signals of similar strengths from the four networks 210, 215, 220 and 225. However, it is further assumed that these networks are not found on the O-PPLMN list or the FPLMN list, so mobile station 115 may consider them to be usable. In this situation, once these networks are identified, the user may be prompted to choose which network they would like to try. In the GSM standards documents, this is referred to as manual network selection. After the user has selected a network, it is tried for connectivity back to home network 205 and, if successful, it is added to the U-PPLMN.

The user interface (UI) to these manual network selections could be a standard dialog box, a pick list, a scrolling menu, or any other UI selection models available. It will be apparent to those skilled in the art that the UI could also include the network capabilities by showing capability identifying strings such as "GPRS" or "GSM" beside each of the network choices for the user. In another embodiment, the user might be presented with a dialog box entitled "GPRS Network Selections" followed by "GSM Network Selections" if all the GPRS networks failed to reach the home PLMN.

Network selection in this situation could instead be automatic, not requiring user intervention. In such a method, mobile station 115 preferably identifies the networks that support GSM and those that support GSM/GPRS and separates the two types of networks. The GSM-only networks are placed on a Discouraged PLMN list (DPLMN) and are only tried after all the GSM/GPRS networks have been tried and failed. The only failure mentioned thus far was around the inability to reach home PLMN 205. Other failures could include: (1) PLMN not allowed; (2) roaming not allowed in this local area; (3) GPRS not allowed; or (4) home network rejection. These errors and others might cause the network to be placed on the FPLMN, as the network link does not seem to be working for mobile station 115.

Manually or automatically selected networks are preferably added to the U-PPLMN list, which may be stored in a writable data store such as Flash memory 224 or RAM 226 (FIG. 2) in mobile station 115. The U-PPLMN list may then be consulted during subsequent network selection procedures. Normally, mobile station 115 will first check the O-PPLMN list for new networks detected during a network selection process before consulting the U-PPLMN list. It may also be possibly to configure a mobile station to check the U-PPLMN list before the O-PPLMN list, depending, for example, upon restrictions controlled by the home network operator, a home service provider, or a mobile station owner.

According to current GSM standards documents, a mobile station has only the limited ability to rescan for a network that is higher in priority on the U-PPLMN list or the O-PPLMN list. If a voice-only GSM or otherwise limited service has been established for a mobile station, however, it may be desirable for the mobile station to periodically check for a new network such as a GSM/GPRS network. This may be done even if the network has a lower priority on the O-PPLMN and U-PPLMN lists. This situation may also arise for other types of mobile stations and networks, where a mobile device is enabled for communications over different types of networks which support different mobile station functions or services.

In FIG. 4, mobile station 115 enters a new region or country and finds coverage (i.e. a 'strong enough' signal) with only one GSM-only base station located on Local Network 4 225. However, as mobile station 115 travels within the same country it may come into coverage of another GSM/GPRS base station, in Local Network 1 210. In GSM standards, mobile station 115 could only camp on the network 210 if it had higher priority in the PPLMN lists. In accordance with the present application, however, mobile station 115 will attempt to rescan for other data-capable networks not previously seen or available upon expiration of a time period or other suitable event. This includes any network that may be lower in priority on the O-PPLMN and U-PPLMN lists. This time interval may be specified or configured by a network operator, SIM manufacturer, network standards documents, mobile station manufacturers, or a user of mobile device 115, as examples. The goal of such rescanning is to improve the network capabilities of mobile station 115. In this example, mobile station 115 has voice support through the Local Network 4 225, but by changing network connections mobile station 115 could obtain data and voice support through Local Network 1 210.

A rescanning process may be triggered or initiated by any suitable event. For example, in the case of an interval timer, a rescanning process may be executed whenever a rescan timer expires. Such a timer is reset appropriately so that rescanning is performed at intervals. If the timer is reset to the same value unless or until the time interval is reconfigured, rescanning will occur at regular intervals. Rescan timing could instead be repeated at different intervals, if the timer is reset to different values after some number of unsuccessful rescan operations during which no new data-capable network is found. In order to avoid rescanning at typically high network traffic times, rescanning could also be restricted during certain times of day. Rescanning could also or alternatively be performed when a mobile station detects a change in regions, or when a mobile station acquires a voice-only network connection in new region. If the mobile station detects an available network capable of both voice and data communications, then the mobile station preferably attempts to camp on this network. Received signal strengths and PPLMN lists may be used substantially as described above during a rescan process. Since a primary goal of the rescanning process is to find an available data communication service for the mobile station, rescanning is preferably disabled when a mobile station is already operating within a network which has the data communication service already available.

When a current network is on the O-PPLMN list or the U-PLMN list, and a newly discovered network is not on the PPLMN list, the mobile station may remain on the current network instead of switching to a new network. It is likely that most GSM/GPRS networks have been included somewhere on the O-PPLMN list or possibly the U-PPLMN list. A network change during a rescan process may also be dependent upon relative signal strengths to avoid switching from a strong GSM network to a significantly weaker GSM/GPRS network. Acceptable signal strength differences may be stored, for example, in a memory of a mobile station.

Time-Efficient Selection Of Data-Capable Networks For Data-Capable Mobile Devices. Thus, a better and non-traditional network selection technique for data-capable mobile stations involves prioritizing the selection of data-capable communication networks (e.g. GPRS) over voice-only networks (e.g. GSM). In such a procedure, the mobile station may have to determine whether or not the data service is actually made available by the communication network. Conventionally, a mobile station makes a request for a data service which may be accepted or denied by the network. When data service is denied, the mobile station receives different "reject cause codes" from the network which are associated with different reasons for service denial. Depending on the reject code, the mobile station may have to wait until it may request the data service again, a timer expires, the network changes, or the user cycles the power (off & on) of the mobile device. If the end user is not viewing the display of the mobile station (e.g. the mobile station is carried in a holster), the user will not be aware of the data service unavailability and may not receive important push data in a timely fashion (e.g. pushed e-mail messages). In a related efficiency problem, if the GPRS attach or a Routing Area Update (RAU) attempt is not successful with the network (e.g. no network response, or the receipt of a rejection code), the mobile station consecutively reattempts for up to five (5) times. If the GPRS attach or RAU attempt counter is greater than or equal to five, the mobile station must place itself into a "GPRS Deregistered" state and start a timer designated as "timer 3302". Timer 3302 is set to a value taken from GSM timer 3212, which is a periodic location update timer. See e.g. 3GPP specification 4.08 Release 1997. From 3GPP specification 24.08 Release 1999, the default value of T3302 is 12 minutes if one is not provided by the network. The mobile station ordinarily receives the value for timer 3212 over-the-air by the network or, if one is not provided by the network, utilizes a default value. If provided over-the-air by the network, the timer may be set to up to four (4) hours. The mobile station is not able to attempt for GPRS services again until this timer 3302 expires. As apparent, this may cause substantial data delays (e.g. delays in receiving "pushed" e-mail messages).

Figure 5:
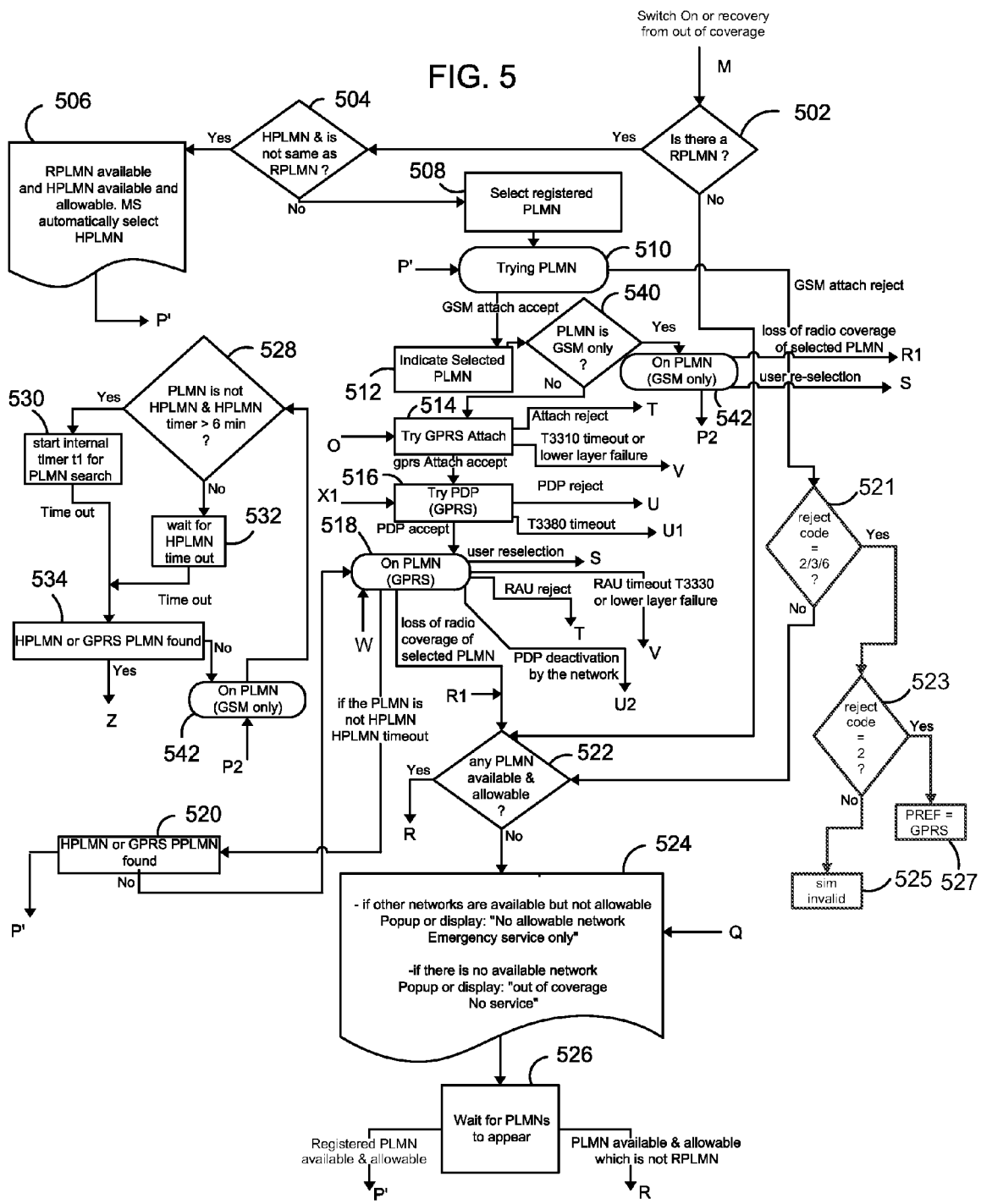
FIGS. 5, 6, and 7 form a flowchart for automatic network selection according to the present application.
Figure 6:
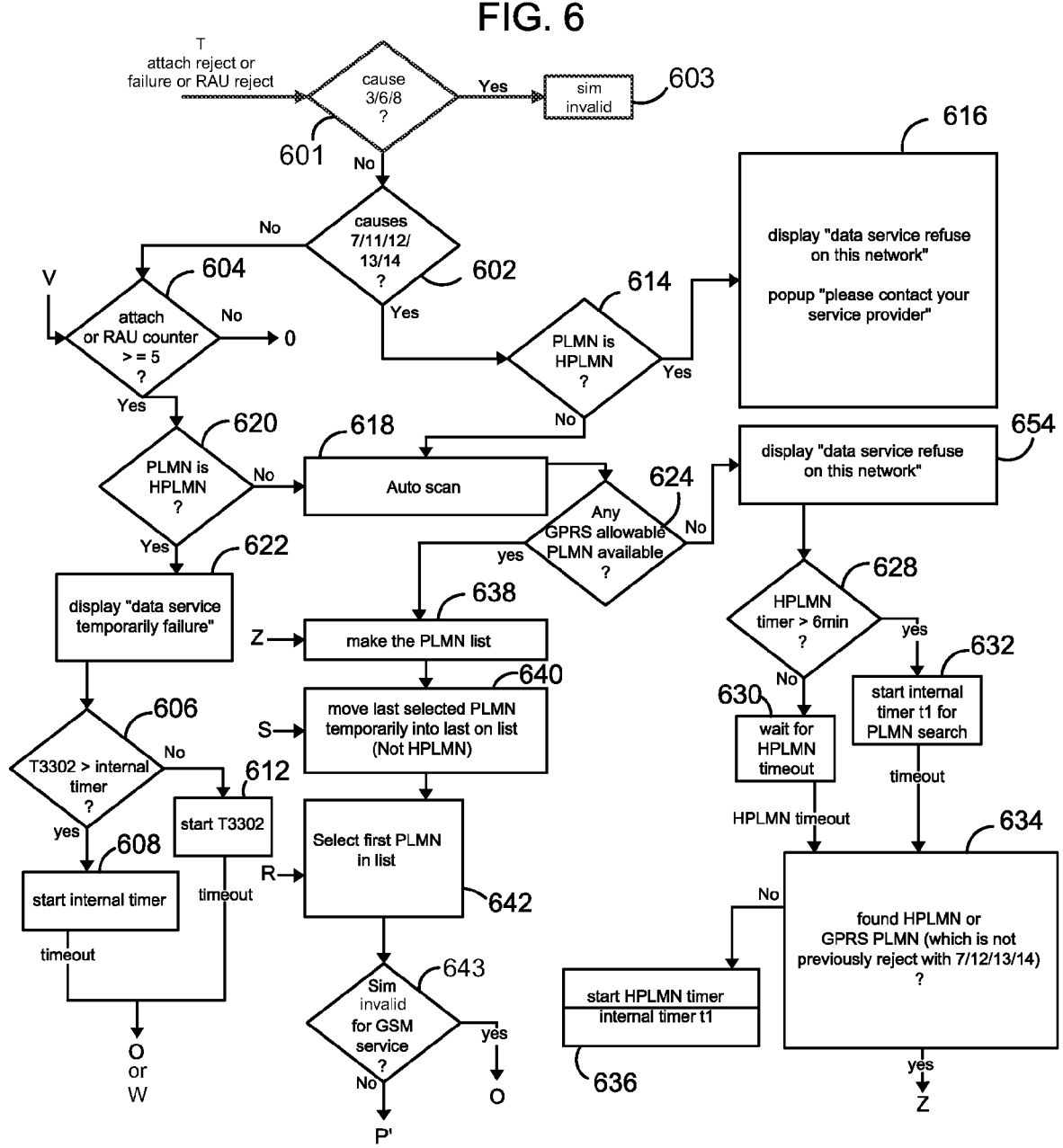
Figure 7:
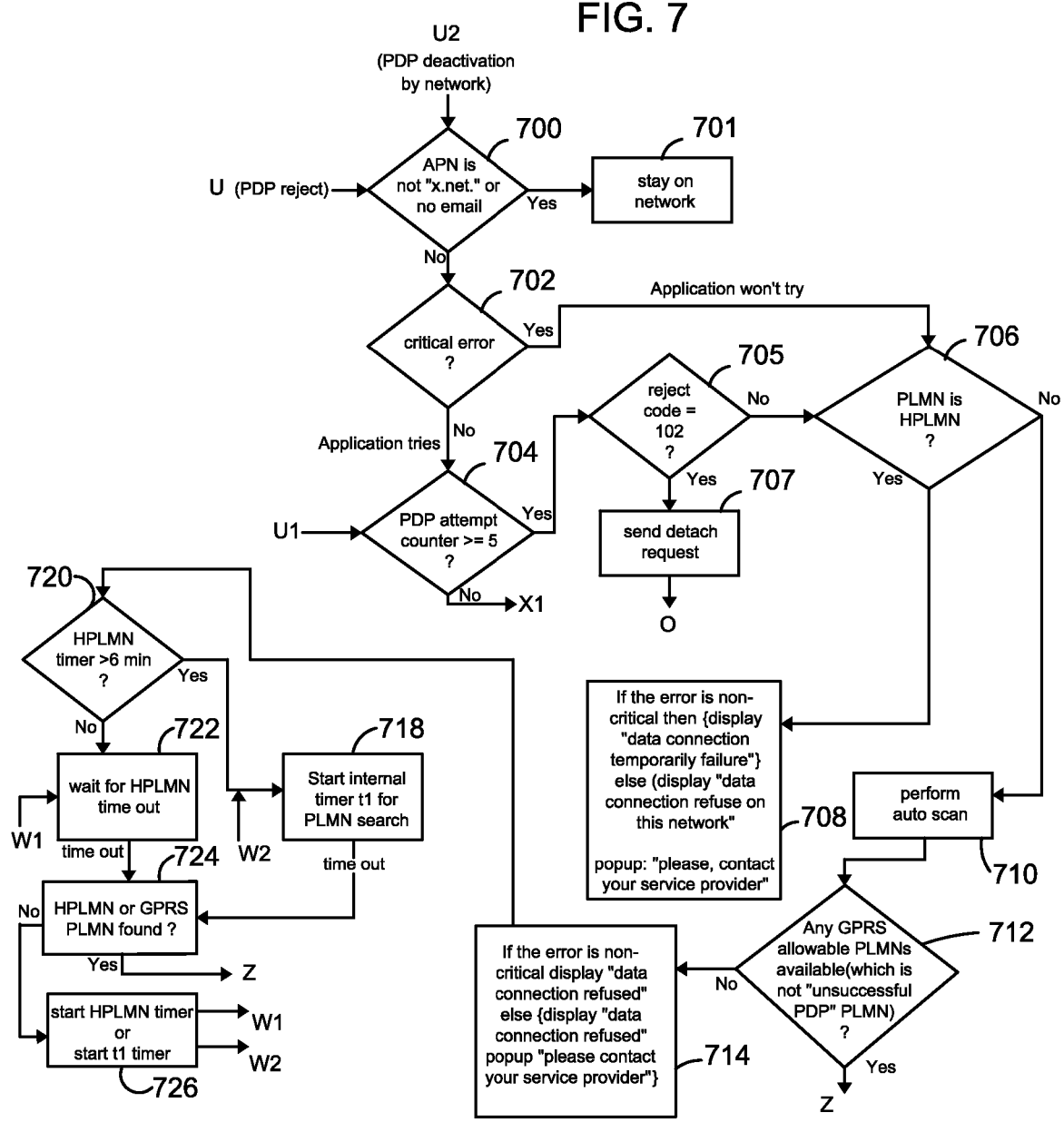

FIGS. 5, 6, and 7 form a flowchart which describes a specific method of automatic network selection performed by a mobile station. This method includes a more time-efficient selection of a data-capable network according to the present application, so as to overcome the deficiencies of conventional techniques. A computer program product of the present application includes a storage medium and computer instructions stored in the storage medium, where the computer instructions are executable by one or more processors of a mobile station for performing the method described. The mobile station of the present application includes one or more processors and a wireless transceiver coupled to the one or more processors, where the one or more processors are operative to perform the method described.

Beginning at a connector M of FIG. 5, where the mobile station gets powered on or recovers from an out-of-coverage condition, a scanning operation identifies available networks within the mobile station's coverage area. From the scan list, the mobile station identifies whether or not there is a Registered PLMN (RPLMN) (step 502). An RPLMN is only acknowledged as an RPLMN if it had a data connection (e.g. GPRS connection); otherwise the RPLMN is not acknowledged as an RPLMN. If there is an RPLMN in step 502, then the mobile station identifies whether there is a Home PLMN and whether that HPLMN is not the same as the RPLMN (step 504). If "YES" at step 504, the mobile station selects the HPLMN (step 506) in this case where the RPLMN is available and the HPLMN is available and allowable. If "NO" at step 504, the mobile station selects the RPLMN (step 508). After step 508, and after step 506 where the mobile station selects the HPLMN, the mobile station attempts registration with the selected PLMN (step 510). Note that a connector P' leads to step 510 as well. By "available", it is meant that the network is available in the coverage area of the mobile station; by "allowable", it is meant that the network provides at least GSM service (e.g. obtained through a GSM attach procedure).

Upon an unsuccessful registration at step 510 (i.e. a GSM attach reject), the mobile station receives a reject code from the network. The reject code is tested and, if the reject code has a value of 2, 3, or 6 (step 521), then the mobile station proceeds to step 523. In step 523, the mobile station tests whether the reject code has a specific value of 2. If the reject code=2 in step 523, then the mobile station records that the network is preferred as GPRS (step 527) where the flow continues through a connector O. If the reject code does not have a value of 2 as identified in step 523, then the SIM is designated as invalid until power off or SIM card removal (step 525). If the reject code does not have a value of 2, 3, or 6 at step 521, then the flow proceeds to step 522. Upon a successful registration at step 510 (i.e. a GSM attach accept), the selected PLMN is indicated in a visual display of the mobile station (step 512). From step 512, the mobile station identifies in step 540 whether the PLMN is GSM-only (i.e. no data service). If "YES" in step 540, the mobile station remains registered and connected through this PLMN (state 542). In state 542, the mobile station may experience an out-of-coverage condition where operation proceeds through a connector R1. On the other hand, in state 542 the mobile station may receive a user manual reselection of a network and thereafter proceed through a connector S (FIG. 6). Further in step 542, operation through connector P2 may lead to step 528, where the mobile station identifies whether the PLMN is not the HPLMN and the HPLMN timer is greater than 6 minutes. If "YES" at step 528, then the mobile station starts an internal timer t1 for a PLMN search (step 530). If "NO" at step 528, the mobile station waits for the HPLMN timer to timeout (step 532). Upon timeouts in steps 530 and 532, the mobile station identifies whether the HPLMN or a data-capable (e.g. GPRS capable) PLMN was found (step 534). If "YES" at step 534, then operation proceeds through a connector Z. If "NO" at step 534, then operation continues in state 542.

If "NO" from step 540, then operation proceeds to step 514. In step 514, the mobile station attempts a GPRS attach request with the selected network (step 514). If successful at step 514, the mobile station attempts a PDP context request with the selected network (step 516). If successful at step 516, the mobile station remains registered and connected through this PLMN (state 518). Note that a connector W leads to state 518 as well. Note also that connector O leads to step 514, and a connector X1 leads to step 516. In step 514, the mobile station may receive a reject code from the network in response to the GPRS attach request and thereafter proceed through a connector T (FIG. 6). On the other hand, in step 514 there may be a T3310 timer timeout or a low layer failure where operation proceeds through a connector V (FIG. 6). In step 516, the mobile station may receive a reject code from the network in response to the PDP context request and thereafter proceed through a connector U (FIG. 7). On the other hand, in step 516 there may be a T3380 timer timeout where operation proceeds through a connector U1 (FIG. 7).

In state 518, the mobile station may receive a user manual reselection of a network and thereafter proceed through a connector S (FIG. 6). Also in state 518, the mobile station may experience a Routing Area Update (RAU) rejection and thereafter proceed through a connector T (FIG. 6). Further in state 518, the mobile station may experience a RAU T3330 timeout or a lower layer failure and thereafter proceed through a connector V (FIG. 6). Even further in state 518, if the current PLMN is not the HPLMN, a periodic HPLMN timer expiration invokes the mobile station to identify whether the HPLMN or data-capable PPLMN is now available (step 520). If the HPLMN or a data-capable PPLMN is available in step 520, the operation proceeds through a connector P'. If the HPLMN or a data-capable PPLMN is not available in step 520, the mobile station remains registered and connected through the PLMN in state 518. Yet even further in state 518, a PDP deactivation from the network leads operation through connector U2.

In state 518, the mobile station may also experience an out-of-coverage condition with the PLMN and thereafter proceed to step 522. Step 522 is also performed if there is no RPLMN identified in step 502, or a GSM attach reject <> 2 is identified from step 521, or a radio coverage loss is experienced from state 542 (through connector R1). In step 522, the mobile station identifies whether there is any PLMN available and allowable. If there is any PLMN available and allowable, the operation proceeds through a connector R (FIG. 6). If there is no PLMN available and allowable at step 522, then the mobile station will display "No Allowable Network—Emergency Service Only" (where other networks are available but not allowable) (step 524). If there is no available network at step 522, then the mobile station will display "Out-Of-Coverage—No Service" in step 524. Note that a connector Q leads to step 524 as well. After step 524, the mobile station will wait for PLMNs to become available (state 526). If the RPLMN becomes available and allowable in state 526, then operation proceeds through connector P'. If a non-RPLMN becomes available and allowable in state 526, then operation proceeds through connector R.

Reference will now be made to FIG. 6, which continues with the automatic network selection and particularly describes the handling of reject codes from networks in response to GPRS attach requests from a mobile station. Connector T is from step 514 of FIG. 5, where the network sends a reject code to the mobile station in response to a GPRS attach request. If the reject code has a value of 3, 6, or 8 as identified in step 601, then the SIM is designated as invalid until power off or SIM card removal (step 603). If the reject code does not have a value of 3, 6, or 8 as identified in step 601, then flow proceeds to step 602. If the reject code has a value of 7, 11, 12, 13, or 14 in step 602, the rejection is deemed critical and operation proceeds to step 614 where the mobile station will generally immediately proceed to reselect a different network. If the reject code has any other value (i.e. not 7, 11, 12, 13, or 14) as tested in step 602, the rejection is deemed non-critical and operation proceeds to step 604 where the mobile station will generally reattempt with the network. Note that a critical error is deemed one in which a permanent problem or fault exists with the network or the end user's service subscription; a non-critical error is not critical but rather is one in which there is a problem or fault with the network or service subscription that may be passing or temporary. A reject code having a value of 3 corresponds to an illegal mobile station; a value of 6 corresponds to an illegal mobile equipment; and a value of 8 corresponds to GPRS services and non-GPRS services not being allowed. A reject code having a value of 7 corresponds to GPRS services not allowed; a value of 11 corresponds to PLMN not allowed; a value of 12 corresponds to location area not allowed; a value of 13 corresponds to roaming not allowed in the current location area; and a value of 14 corresponds to GPRS services not allowed by the current PLMN.

In step 604, the mobile station checks an attach counter (or RAU counter) to see if its value is greater than or equal to five (5). Note that a connector V leads to step 604 as well. If the attach counter (RAU counter) is not greater than or equal to five, then operation proceeds through connector O (if attach reject/no network response) or connector W (if RAU reject/no network response) (FIG. 5). If the attach counter (RAU counter) is greater than or equal to five, then the mobile station proceeds to check whether the PLMN is the HPLMN (step 620). If the PLMN is the HPLMN at step 620, then the mobile station displays "Temporary Failure of Data Service" (step 622) and proceeds to check whether a timer T3302 is set to a value that is greater than a predetermined internal timer value (step 606). The internal timer value is typically set to between 5-30 minutes, and preferably greater than 12 minutes (e.g. between 13 and 30 minutes). Alternatively, the internal timer value is set to between 5-10 minutes, preferably about 6 minutes. If timer T3302 is greater than the internal timer value at step 606, the mobile station starts a timer based on the internal timer value (step 608). If timer T3302 is greater than the internal timer value at step 606, the mobile station starts a timer based on the timer T3302 value (step 612). Upon timeout from either of the timers at steps 608 and steps 612, then operation proceeds through connector O (if attach reject/no network response) or connector W (if RAU reject/no network response).

In step 614, the mobile station detects whether the current PLMN is the HPLMN. If the current PLMN is the HPLMN, then operation proceeds to step 616. In step 616, the mobile station displays "Data Service Refused on this Network—Please Contact your Service Provider" (step 616). If the current PLMN is not the HPLMN at step 614, then the mobile station operates to scan for a new network (step 618). Step 618 is also performed in response to a "NO" decision at step 620 previously described above. After step 618, the mobile station identifies whether there are any data-capable (i.e. GPRS capable) PLMNs available and allowable (step 624). If there are data-capable PLMNs available and allowable, then the mobile station configures and marks the PLMN list accordingly (step 638). For example, PLMNs that are data-capable may be flagged as preferred in the PLMN list. Note that connector Z leads to step 638 as well. Next, the last selected PLMN is moved into the last position of the PLMN list (step 640) (with the exception of the HPLMN which is placed "second" in the list). Note that connector S leads to step 640 as well. The first PLMN in the PLMN list is then selected by the mobile station (step 642). Note that connector R also leads to step 642. The mobile station then identifies whether its SIM is invalid for GSM service (step 643). If the SIM is invalid for GSM service at step 643, then operation proceeds through a connector O (FIG. 5). If the SIM is not invalid for GSM service at step 643, then operation proceeds through a connector P' (FIG. 5).

In step 624 if there are no data-capable PLMNs available, then the mobile station displays "Data Service Refused on this Network" (step 654) and proceeds to step 628. In step 628, the mobile station checks whether the HPLMN timer is greater than 6 minutes. If the HPLMN timer is greater than 6 minutes, the mobile station starts an internal timer t1 for PLMN search (step 632). If the HPLMN timer is not greater than 6 minutes, the mobile station waits for the HPLMN timer to timeout (step 630). When a timeout occurs from either step 630 or 632, the mobile station identifies whether the HPLMN or a GPRS PLMN has been found (step 634). This PLMN must not have been previously rejected with a reject code of 7, 12, 13, or 14. If "YES" at step 634, then operation proceeds through a connector Z. If "NO" at step 634, then the mobile station starts the HPLMN timer or internal timer t1 (step 636).

Reference will now be made to FIG. 7, which continues with the automatic network selection and particularly describes the handling of reject codes from networks in response to PDP context requests from a mobile station. Connector U2 is from step 518, where the network sends a PDP deactivation to the mobile station. Connector U is from step 516 of FIG. 5, where the network sends a reject code to the mobile station in response to a PDP context request. From connector U and U2, the mobile station tests whether the current APN is not a "X.net" type APN (i.e. a predetermined address) or does not support e-mail service (step 700). If "YES" at step 700, then the mobile station remains on the current network (step 701). If "NO" at step 700, then the flow proceeds to step 702 where the mobile station tests the reject code received from the network. A reject code is an indication that the network has rejected the request for data connectivity for some reason. If the reject code is deemed non-critical (step 702), then operation proceeds to step 704 where the mobile station will generally reattempt with the network. If the reject code is deemed critical at step 702, then operation proceeds to step 706 where the mobile station will generally reselect a different network.

In the present embodiment, reject codes that are deemed non-critical are 26, 31, 34, 102, 38, 36, 39, and 35. Reject code 26 corresponds to insufficient resources; reject code 31 corresponds to an unspecified activation rejection; reject code 34 corresponds to the service option being temporarily out-of-order; reject code 102 corresponds to a timeout from no response from the network; reject code 38 corresponds to a network failure; reject code 36 corresponds to a regular PDP context deactivation; reject code 39 corresponds to a reactivation request; and reject code 35 corresponds to the NSAPI already being used. On the other hand, reject codes that are deemed critical are 27, 29, 30, 32, 33, and 25. Reject code 27 corresponds to a missing or unknown APN; reject code 29 corresponds to a user authentication failure; reject code 30 corresponds to the activation being rejected by the GGSN; reject code 32 corresponds to the service option being unsupported; reject code 33 corresponds to the service option not being subscribed to; and reject code 25 corresponds to an LLC or SNDCP failure.

In step 704, the mobile station checks whether the PDP attempt counter is greater than or equal to five (5). Note that connector U1 leads to step 704 as well. If the PDP attempt counter is not greater than or equal to five, then operation proceeds through a connector X1. If the PDP attempt counter is greater than or equal to five, the mobile station tests whether the reject code has a value of "102" (step 705). If the reject code has a value of "102", then the mobile station sends a detach request to the network (step 707) and proceeds through a connector O. If the reject code does not have a value of "102" at step 705, then the mobile station checks whether the current PLMN is the HPLMN (step 706). Step 706 is also performed if the mobile station identifies that the reject code is indeed a critical error from step 702. If "YES" at step 706, then operation proceeds to step 708. In step 708, the mobile station displays "Data Connection Temporarily Failed" if the error is non-critical or "Data Connection Refused on Network—Please Contact Your Service Provider" if the error is critical (step 708). If "NO" at step 706, the mobile station scans to identify available networks (step 710). The mobile station then identifies whether there are any data-capable (e.g. GPRS-capable) PLMNs allowable and not having an unsuccessful PDP context (step 712). If there is a data-capable PLMN available, then operation proceeds through connector Z. If there is no data-capable PLMN available, then the mobile station displays "Data Connection Refused" if the error is non-critical or "Data Connection Refused—Please Contact Your Service Provider" if the error is critical (step 714).

Next, the mobile station checks whether the HPLMN timer is greater than 6 minutes (step 720). If the HPLMN timer is greater than 6 minutes, the mobile station starts an internal timer t1 for PLMN search (step 718). If the HPLMN timer is not greater than 6 minutes from step 720, the mobile station waits for the HPLMN timer to timeout (step 722). Note that connector W1 leads to step 722 as well. When a timeout occurs, the mobile station identifies whether the HPLMN or a data-capable (e.g. GPRS capable) PLMN has been found (step 724). If the HPLMN or data-capable PLMN is found, then operation proceeds through a connector Z. If no HPLMN or data-capable PLMN is found, then the mobile station starts the HPLMN timer or internal timer t1 (step 726).

Preferably, an indication is made in memory of the mobile station of whether the wireless network currently makes the voice and data connectivity available to the mobile station. The indication for the wireless network may be indicative of "currently available data connectivity" if the request for data connectivity is accepted by the wireless network, or indicative of "currently unavailable data connectivity" if the reject code comprising the critical error is received or if the one or more requests for data connectivity through the wireless network are reattempted without success. Similar results may be achieved through use of a list of currently unavailable data connectivity networks stored in memory. Such a list includes the wireless network if the reject code comprising the critical error is received or if the one or more requests for data connectivity through the wireless network are reattempted without success; however the list fails to include the wireless network if the request for data connectivity is accepted by it.

Figure 8:
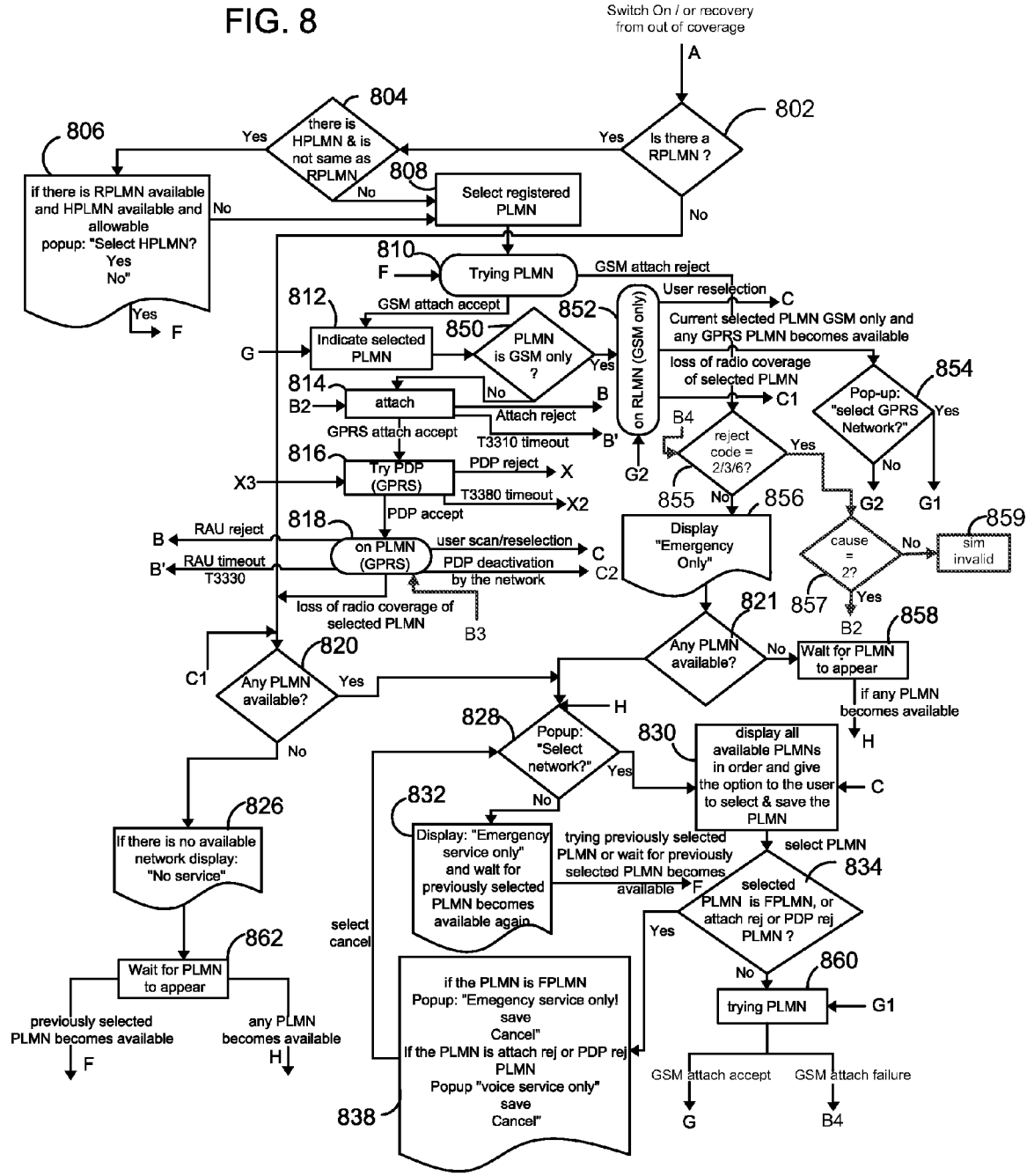
FIGS. 8, 9, and 10 form a flowchart for manual network selection according to the present application.
Figure 9:
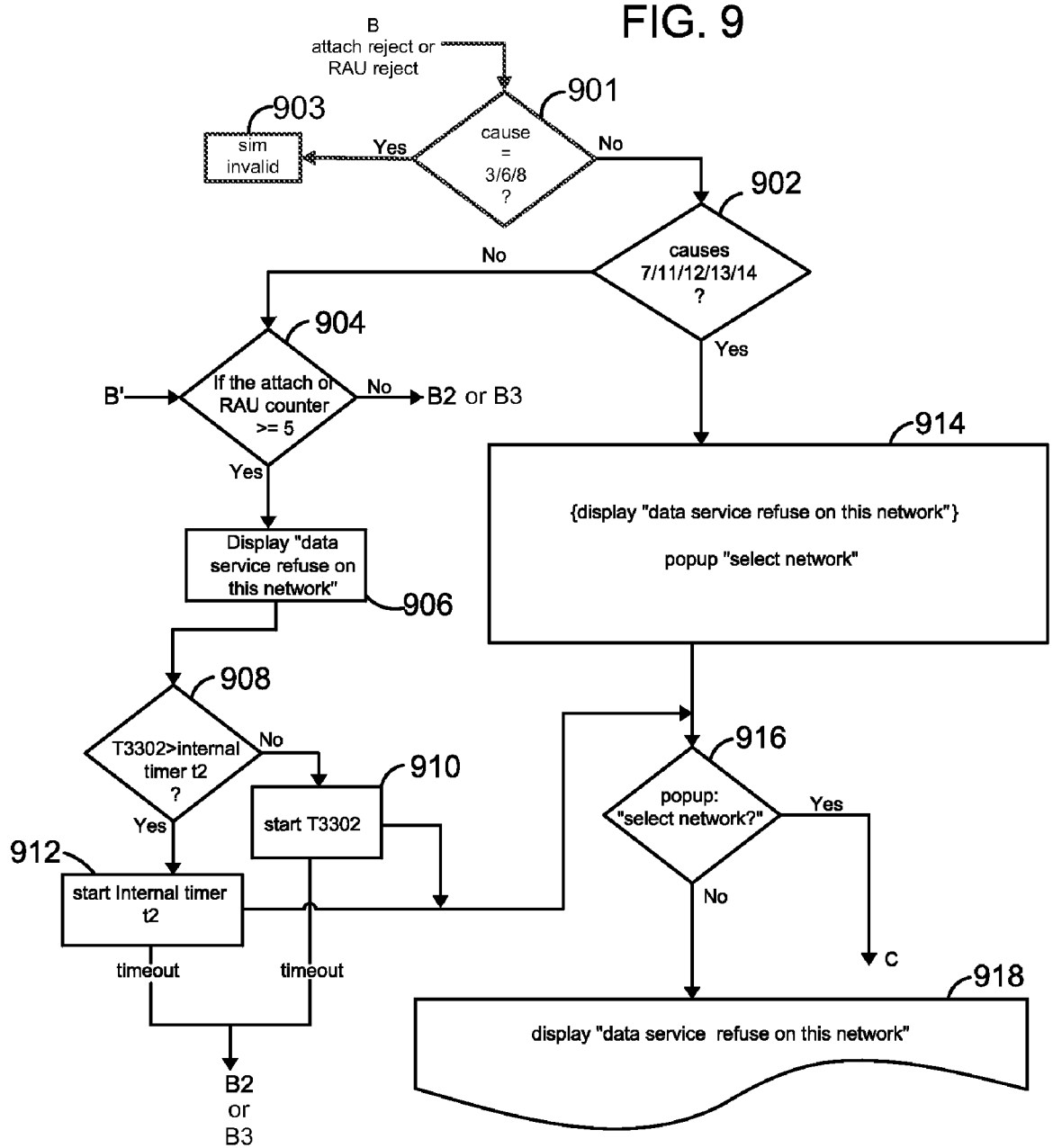
Figure 10:
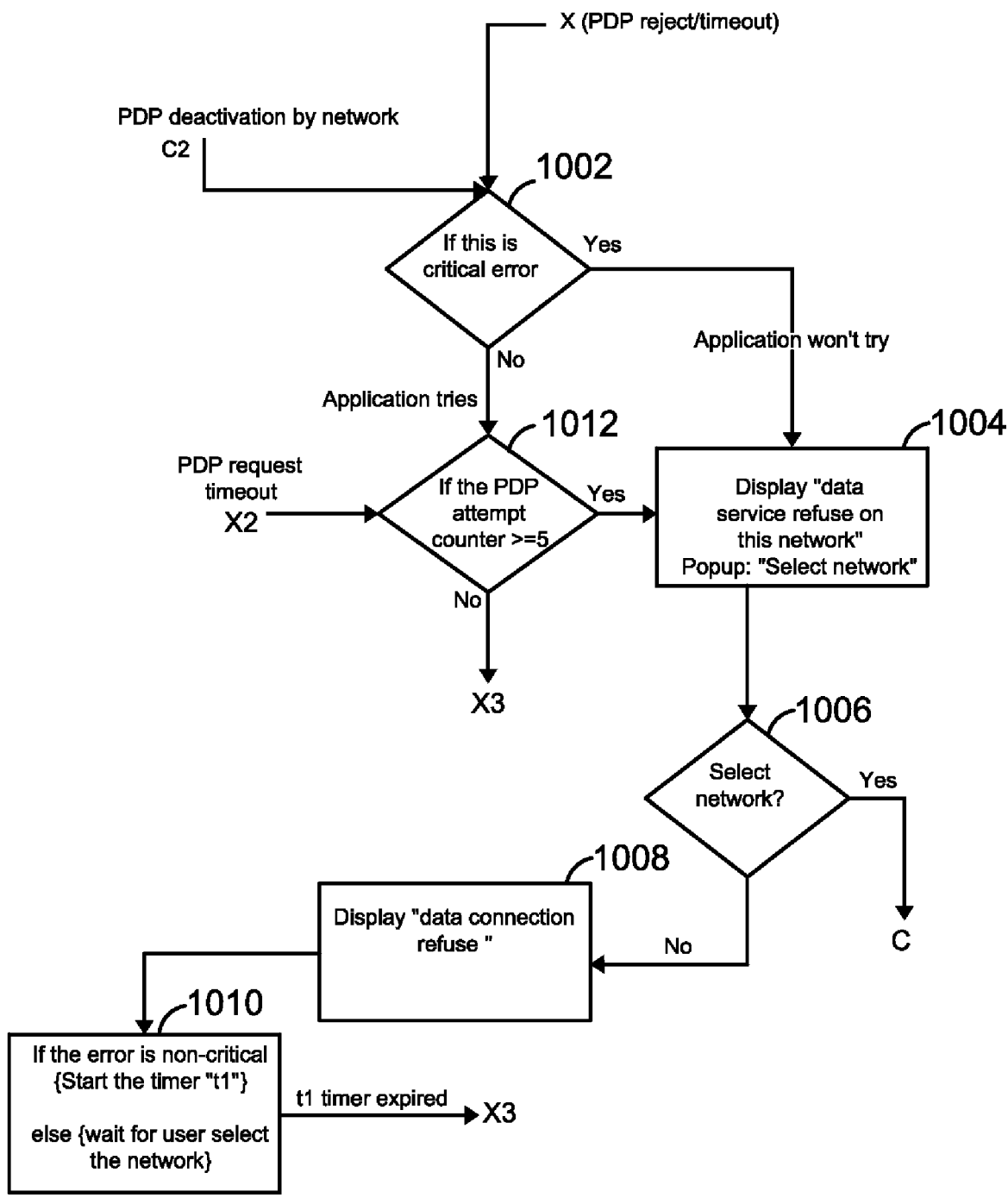

FIGS. 8, 9, and 10 form a flowchart which describes a specific method of manual network selection provided by a mobile station for an end user. This method also includes a more time-efficient selection of a data-capable network according to the present application, so as to overcome the deficiencies of conventional techniques. A computer program product of the present application includes a storage medium and computer instructions stored in the storage medium, where the computer instructions are executable by one or more processors of a mobile station for performing the method described. The mobile station of the present application includes one or more processors and a wireless transceiver coupled to the one or more processors, where the one or more processors are operative to perform the method described.

Beginning at a connector A of FIG. 8, where the mobile station gets powered on or recovers from an out-of-coverage condition, a scanning operation identifies available networks within the mobile station's coverage area. From the scan list, the mobile station identifies whether or not there is a Registered PLMN (RPLMN) (step 802). An RPLMN is only acknowledged as an RPLMN if it had a data connection (e.g. GPRS connection); otherwise the RPLMN is not acknowledged as an RPLMN. If there is an RPLMN in step 802, then the mobile station identifies whether there is a Home PLMN and whether that HPLMN is not the same as the RPLMN (step 804). If "YES" at step 804, the mobile station displays "Select HPLMN" (step 806) in this case where the RPLMN is available and allowable. If "NO" at step 804, the mobile station selects the RPLMN (step 808) and attempts registration ("GSM attach") with it (step 810). If the end user selects "YES" in step 806 for selection of the HPLMN, then flow proceeds through a connector F to step 810. If the end user selects "NO" in step 806, then flow proceeds to step 808.

If the GSM attach is accepted at step 810, the selected PLMN is indicated in a visual display of the mobile station (step 812). Step 812 is also performed through a connector G as well. Next, the mobile station identifies whether the PLMN is GSM-only (i.e. no data service) (step 850). If "NO" at step 850, then operation leads to step 814 to be described later. If "YES" at step 850, then the mobile station remains registered and operates on this PLMN (state 852). Note that a connector G2 leads to state 852. In state 852, the mobile station may receive a user manual selection of a network and thereafter proceed through a connector C. Also in state 852, if the mobile station identifies that the current PLMN is GSM-only and any GPRS PLMN becomes available, operation proceeds to step 854 where the mobile station displays "Select GPRS Network?". If the end user selects "YES" for this option, then operation proceeds through connector G1; otherwise operation proceeds through connector G2. Further in state 852, the mobile station may experience an out-of-coverage condition with the PLMN and thereafter proceed through connector C1.

If the GSM attach was rejected in step 810, the mobile station receives a reject code from the network. This reject code is tested and, if the reject code has a value of 2, 3, or 6 (step 855), then the flow continues to step 857. If the reject code has a specific value of 2 as identified in step 857, then flow continues through a connector B2. If the reject code does not have a specific value of "2" in step 857, then the SIM is designated as invalid until power off or SIM card removal (step 859). If the reject code does not have a value of 2, 3, or 6 as identified in step 855, then the mobile station displays "Emergency Service Only" (step 856) and continues to step 821. Note that a connector H1 leads to step 856 as well. Next, the mobile station identifies whether any PLMNs are available (step 821). If no PLMNs are available at step 821, the mobile station waits for any PLMNs to appear (step 858) and proceeds through connector H when one does. If one or more PLMNs are available at step 821, the mobile station proceeds to step 828 to be described later.

If in step 850, the mobile station identifies that the PLMN is not GSM-only (i.e. it may offer data service), then the mobile station attempts a GPRS attach request with the selected network (step 814). Note that a connector B2 leads to step 814 as well. If successful at step 814, the mobile station attempts a PDP context request with the selected network (step 816). If successful at step 816, the mobile station remains registered and connected through this PLMN (state 818). Note that a connector B3 leads to state 818 as well.

In step 814, the mobile station may receive a reject code from the network in response to the GPRS attach request and thereafter proceed through a connector B (FIG. 9). On the other hand, in step 814 there may be a T3310 timer timeout where operation proceeds through a connector B' (FIG. 9). In step 816, the mobile station may receive a reject code from the network in response to the PDP context request and thereafter proceed through a connector X (FIG. 10). Also in step 816, there may be a T3380 timer timeout where operation proceeds through a connector X2. Note also that a connector X3 leads to step 816 as well. In state 818, the mobile station may receive a user manual selection of a network and thereafter proceed through a connector C. Also in state 818, the mobile station may experience a Routing Area Update (RAU) rejection and thereafter proceed through a connector B (FIG. 9). Further in state 818, the mobile station may experience a RAU T3330 timeout and thereafter proceed through a connector B' (FIG. 9). Further in state 818, the mobile station may receive a PDP deactivation by the network and thereafter proceed through connector C2. Yet even further in state 818, the mobile station may experience an out-of-coverage condition with the PLMN and thereafter proceed to step 820. Step 820 is also performed if there is no RPLMN identified in step 802.

In step 820, the mobile station identifies whether there is any PLMN available. If there is no PLMN available at step 820, then the mobile station displays "No Service" (step 826). The mobile station will then wait for any PLMNs to appear (step 862). If the previously selected PLMN becomes available in step 862, then operation proceeds through a connector F; otherwise if any other PLMN becomes available, operation proceeds through a connector H. If there is any PLMN available in step 820, then the mobile station then displays "Select Network" for the user to choose whether to manually select a network (step 828). Note that a connector H leads to step 828 as well. If the user selects "YES" at step 828, the mobile station displays all available PLMNS in order and gives the user the option to select one of the PLMNs (step 830). Note that a connector C leads to step 830 as well. Once the user selects a network in step 830, the mobile station attempts to register with the selected PLMN. The mobile station then identifies whether the selected PLMN is a Forbidden PLMN (FPLMN), or whether there is a GPRS attach rejection, or whether there is a PDP context rejection (step 834). If "YES" at step 834, then operation proceeds to step 838. If in step 838 the PLMN is the FPLMN, then the mobile station displays "Emergency Service Only. Select SAVE or CANCEL" (step 838). If the PLMN had a GPRS attach rejection or PDP context rejection, then the mobile station displays "Voice Service Only. Select SAVE or CANCEL" (step 838). After step 838, if the end user selects CANCEL then operation proceeds back to step 828. If "NO" at step 834, then the mobile station attempts registration ("GSM attach") with the PLMN (step 860). Note that a connector G1 also leads to step 860. If the GSM attach is accepted at step 860, then operation proceeds through a connector G. If the GSM attach is rejected at step 860, then operation proceeds through a connector B4. If the end user selects "NO" in step 828, then the mobile station displays "Emergency Service Only" and waits for the previously selected PLMN to become available again (step 832). The mobile station will try the previously selected PLMN or wait for a previously selected PLMN to become available, where operation proceeds through a connector F.

Reference will now be made to FIG. 9, which continues with the manual network selection and particularly describes the handling of reject codes from networks in response to GPRS attach requests from a mobile station. Connector B is from step 814 of FIG. 8, where the network sends a reject code to the mobile station in response to a GPRS attach request. A reject code is an indication that the network has rejected the request for data connectivity for some reason. If the reject code has a value of 3, 6, or 8 as identified in step 901, then the SIM is designated as invalid until power off or SIM card removal (step 903). If the reject code does not have a value of 3, 6, or 8 in step 901, then flow proceeds to step 902. If the reject code has a value of 7, 11, 12, 13, or 14 as identified in step 902, the rejection is deemed critical and operation proceeds to step 914 where the mobile station will generally prompt for manual reselection of a network. If the reject code has any other value (i.e. not 7, 11, 12, 13, or 14) as identified in step 902, the rejection is deemed non-critical and operation proceeds to step 904 where the mobile station will generally reattempt with the network. Note that a critical error is deemed one in which a permanent problem or fault exists with the network or the end user's service subscription; a non-critical error is not critical but rather is one in which there is a problem or fault with the network or service subscription that may be passing or temporary. A reject code having a value of 3 corresponds to an illegal mobile station; a value of 6 corresponds to an illegal mobile equipment; and a value of 8 corresponds to GPRS services and non-GPRS services not being allowed. A reject code having a value of 7 corresponds to GPRS services not allowed; a value of 11 corresponds to PLMN not allowed; a value of 12 corresponds to location area not allowed; a value of 13 corresponds to roaming not allowed in the current location area; and a value of 14 corresponds to GPRS services not allowed by the current PLMN.

In step 904, the mobile station checks an attach/RAU counter to see if its value is greater than or equal to five (5). Note that a connector B' leads to step 904 as well. If the attach/RAU counter is not greater than or equal to five, operation proceeds through a connector B2 (if attach reject/no network response) or a connector B3 (if RAU reject/no network response) (FIG. 8). If the attach/RAU counter is greater than or equal to five, then the mobile station immediately displays "Data Service Refused on this Network" (step 906). Next, the mobile station proceeds to check whether a timer T3302 is set to a value that is greater than a predetermined internal timer value t2 (step 908). The internal timer value t2 is typically set to between 5-30 minutes, and preferably to greater than 12 minutes (e.g. between 13 and 30 minutes). Alternatively, the internal timer value is set to between 5-10 minutes, preferably about 6 minutes. If timer T3302 is greater than the internal timer value t2 at step 908, the mobile station starts a timer based on the internal timer value t2 (step 912). If timer T3302 is greater than the internal timer value at step 908, the mobile station starts a timer based on the timer T3302 value (step 910). Upon timeout of the timer from steps 910 and steps 912, operation proceeds to connector B2 (if attach reject/no network response) or connector B3 (if RAU reject/no network response). After steps 910 and 912, the mobile station displays "Select Network?" for the user to choose whether to manually select a network (step 916). If the user selects "YES" at step 916, operation proceeds through connector C. If the user selects "NO" at step 916, the mobile station displays "Data Service Refused on this Network" (step 918). At step 914 from earlier step 902, the mobile station displays "Data Service Refused on this Network" and prompts for end user selection of a network. After step 914, operation proceeds to step 916, described previously above.

Reference will now be made to FIG. 10, which continues with the manual network selection and particularly describes the handling of reject codes from networks in response to PDP context requests from a mobile station. Connector C2 is from step 818 of FIG. 8, where the network sends a PDP deactivation to the mobile station. Connector X is from step 816 of FIG. 8, where the network sends a reject code to the mobile station in response to a PDP context request. If the reject code is deemed non-critical (step 1002), then operation proceeds to step 1012 where the mobile station will generally reattempt with the network. Note that a connector X2 leads to step 1012 as well. If the reject code is deemed critical at step 1002, then operation proceeds to step 1004 where the mobile station will generally prompt for manual reselection of a different network.

In the present embodiment, reject codes that are deemed non-critical are 26, 31, 34, 102, 38, 36, 39, and 35. Reject code 26 corresponds to insufficient resources; reject code 31 corresponds to an unspecified activation rejection; reject code 34 corresponds to the service option being temporarily out-of-order; reject code 102 corresponds to a timeout from no response from the network; reject code 38 corresponds to a network failure; reject code 36 corresponds to a regular PDP context deactivation; reject code 39 corresponds to a reactivation request; and reject code 35 corresponds to the NSAPI already being used. On the other hand, reject codes that are deemed critical are 27, 29, 30, 32, 33, and 25. Reject code 27 corresponds to a missing or unknown APN; reject code 29 corresponds to a user authentication failure; reject code 30 corresponds to the activation being rejected by the GGSN; reject code 32 corresponds to the service option being unsupported; reject code 33 corresponds to the service option not being subscribed to; and reject code 25 corresponds to an LLC or SNDCP failure.

In step 1012, the mobile station identifies whether the PDP attempt counter is greater than or equal to five (5). If the PDP attempt counter is not greater than or equal to five, then operation proceeds to connector X3. If the PDP attempt counter is greater than or equal to five, then the mobile station displays "Data Connection Refused on this Network" and prompts the user whether to manually "Select Network" (step 1004). If the user chooses "YES" for manually selecting a network at step 1006, then operation proceeds through connector C. If the user chooses "NO" for manually selecting a network at step 1006, then the mobile station displays "Data Connection Refused" (step 1008). Next, if the error is non-critical, then the mobile station starts a timer t1; otherwise the mobile station waits for the user to manually select a network (step 1010). If the t1 timer expires from step 1010, then operation continues through connector X3.

Thus, methods and apparatus for selecting a communication network to provide one or more communication services for a mobile station have been described in detail. In general, a scanning operation is performed by the mobile station to identify one or more communication networks which support a voice communication service in a geographic coverage area. The mobile station identifies which of the identified communication networks make a data communication service available for the mobile station. The mobile station then selects and registers with a communication network that makes the data communication service available over a network that fails to make the service available. Preferably, the method is performed in connection with the creation of one or more prioritized network lists. In this case, the mobile station assigns a higher priority in the prioritized network list to a communication network that makes the voice and data communication service available and allowable to it over a communication network that does not. In any event, however, the home network is maintained as the highest priority network for communication with the mobile station.

Advantageously, reduced delays in data service offered by data-capable networks are provided. The method includes the steps of receiving and storing in memory a first timer value which is broadcasted by a wireless communication network for use in the mobile station; causing a request for data connectivity to be transmitted through the wireless network, and reattempting the request up to a plurality of times when data connectivity fails; after the one or more reattempted requests for data connectivity fail, activating a timer based on a second timer value which is less than the first timer value; and repeating the transmitting of requests for data connectivity after expiration of the timer. A computer program product of the present application includes a storage medium and computer instructions stored on the storage medium, where the computer instructions are executable by a processor for performing the method described above.

Such detailed implementation is described in part in relation to steps 604-612 in FIG. 6 and steps 904-912 of FIG. 9, for example. For GSM/GPRS, the timer is T3302 which is based on T3212 (broadcasted over the network) and the preferable time value utilized is between 5-30 minutes. Using traditional techniques, if the GPRS attach or RAU attempt counter is greater than or equal to five, the mobile station must place itself into a "GPRS Deregistered" state and start a timer designated as "timer 3302". Timer 3302 is simply set to a value taken from GSM timer 3212, which is a periodic location update timer. The mobile station ordinarily receives the value for timer 3212 over-the-air by the network or, if one is not provided by the network, utilizes a default value. If provided over-the-air by the network, the timer may be set to up to four (4) hours. The mobile station is not able to attempt for GPRS services again until this timer 3302 expires. As apparent, this traditional technique may cause substantial data delays (e.g. delays in receiving "pushed" e-mail messages). According to the present application, such delays are reduced.

A mobile station of the present application includes one or more processors, memory coupled to the one or more processors, and a wireless transceiver coupled to the one or more processors. The one or more processors are operative to receive and store in memory a first timer value which is broadcasted by a wireless communication network for use in the mobile station; cause a request for data connectivity to be transmitted through the wireless network and reattempt the request up to a plurality of times when data connectivity fails; after the one or more reattempted requests for data connectivity fail, activate a timer based on a second timer value which is less than the first timer value; and repeat the transmitting of requests for data connectivity after expiration of the timer. A communication system of the present application includes a first wireless communication network, a second wireless communication network, and a mobile station operative to select one of the first wireless communication network and the second wireless communication network for communications. The mobile station of the communication system includes the components described above.

It will be appreciated that the above description relates to preferred embodiments by way of example only. Many variations thereof will be obvious to knowledgeable in the field to which the invention pertains, and such variations are within the scope of the invention as described and claimed, whether or not expressly described. For example, although the detailed description has strictly used the term "network" in context of the inventive methods (which presumes substantial homogeneity inside each network), the invention also broadly includes selecting between sub-sections of networks including network subnets and even individual cells. As another example, although embodiments of the invention have placed an emphasis on GSM and GSM/GPRS networks, and voice and data-capable mobile stations, it should be appreciated that the invention is not limited to such networks, mobile stations, and services. The invention is applicable to other systems in which mobile stations are enabled for communication services available to different extents. Finally, although the mobile device oftentimes identifies a plurality of communication networks available within its geographic coverage area, it may sometimes identify only a single available network with which to act upon; this understanding should not in any way limit the interpretation of the claims.

What is claimed is:

1. A method in a mobile device for use in establishing communications in a wireless network, the method comprising:

sending to the wireless network a request for establishing a communication service;

in response to a rejection of the request, reattempting the sending of the request for as long as the total number of requests is less than a predetermined value;

when the total number of rejected requests is greater than or equal to the predetermined value:

if the wireless network is a non-home network of the mobile device, then selecting a different wireless network with which to establish the communication service;

otherwise, if the wireless network is the home network of the mobile device, then:

running a timer which is initialized with an internal timer value instead of a network timer value when the internal timer value is less than the network timer value; and in response to an expiration of the timer, sending to the wireless network another one or more requests for establishing the communication service.

2. The method of claim 1, further comprising:

if the total number of rejected requests is greater than or equal to the predetermined value, and the wireless network is the home network of the mobile device, then setting the mobile communication device in a deregistered state.

3. The method of claim 1, further comprising:

testing the network timer value;

if the network timer value is greater than the internal timer value, then initializing the timer with the internal timer value; and otherwise, if the network timer value is less than the internal timer value, then initializing the timer with the network timer value.

4. The method of claim 1, wherein the communication service is a packet data service of the wireless network.

5. The method of claim 1, wherein the request comprises one of a General Packet Radio Service (GPRS) attach request or a Routing Area Update (RAU) request.

6. The method of claim 1, wherein the predetermined value is five (5).

7. The method of claim 1, wherein the network timer value is a periodic location update timer which is broadcasted from the wireless network and received by the mobile device.

8. The method of claim 7, wherein the periodic location update timer value comprises a timer 3212.

9. The method of claim 1, wherein the timer comprises a timer 3302.

10. The method of claim 1, which is embodied in a computer program product comprising a non-transitory storage medium and computer instructions stored in the storage medium, wherein the computer instructions are executable by one or more processors of the mobile communication device for performing the method.

11. A mobile communication device, comprising:
 one or more processors;
 a radio frequency (RF) transceiver coupled to the one or more processors;
 the one or more processors being configured to:
  send via the RF transceiver a request for establishing a communication service with a wireless network;
  in response to a rejection of the request, reattempt the sending of the request for as long as the total number of requests is less than a predetermined value;
  when the total number of rejected requests is greater than or equal to the predetermined value:
   if the wireless network is a non-home network of the mobile device, then select a different wireless network with which to establish the communication service;
   otherwise, if the wireless network is the home network of the mobile device, then:
    run a timer which is initialized with an internal timer value instead of a network timer value when the internal timer value is less than the network timer value; and
    in response to an expiration of the timer, send via the RF transceiver another one or more requests for establishing the communication service with the wireless network.

12. The mobile communication device of claim 11, wherein the one or more processors are further configured to:
 if the total number of rejected requests is greater than or equal to the predetermined value, and the wireless network is the home network of the mobile device, then set the mobile communication device in a deregistered state.

13. The mobile communication device of claim 11, wherein the one or more processors are further configured to:
 test the network timer value;
 if the network timer value is greater than the internal timer value, then initialize the timer with the internal timer value; and
 otherwise, if the network timer value is less than the internal timer value, then initialize the timer with the network timer value.

14. The mobile communication device of claim 11, wherein the communication service is a packet data service of the wireless network.

15. The mobile communication device of claim 11, wherein the request comprises a General Packet Radio Service (GPRS) attach request.

16. The mobile communication device of claim 11, wherein the request comprises a Routing Area Update (RAU) request.

17. The mobile communication device of claim 11, wherein the network timer value is a periodic location update timer which is broadcasted from the wireless network and received by the mobile device.

18. The mobile communication device of claim 17, wherein the periodic location update timer value comprises a timer 3212.

19. The mobile communication device of claim 11, wherein the timer comprises a timer 3302.

20. A communication system, comprising;
 a wireless network;
 a mobile communication device configured to communicate in the wireless communication network;
 the mobile communication device being further configured to:
  send to the wireless network a request for establishing a communication service with a wireless network;
  in response to a rejection of the request, reattempt the sending of the request for as long as the total number of requests is less than a predetermined value;
  when the total number of rejected requests is greater than or equal to the predetermined value:
   if the wireless network is a non-home network of the mobile device, then select a different wireless network with which to establish the communication service;
   otherwise, if the wireless network is the home network of the mobile device, then:
    run a timer which is initialized with an internal timer value instead of a network timer value when the internal timer value is less than the network timer value; and
    in response to an expiration of the timer, send to the wireless network another one or more requests for establishing the communication service with the wireless network.

\* \* \* \* \*